US011287835B2

(12) United States Patent
Jourdan et al.

(10) Patent No.: US 11,287,835 B2

(45) Date of Patent: Mar. 29, 2022

(54) GEO-FIDUCIALS FOR UAV NAVIGATION

(71) Applicant: WING Aviation LLC, Mountain View, CA (US)

(72) Inventors: Damien Jourdan, San Jose, CA (US); Brandon Jones, Redwood City, CA (US); Richard Roberts, Mountain View, CA (US)

(73) Assignee: WING Aviation LLC, Mountain View, CA (US)

( * ) Notice: Subject to any disclaimer, the term of this patent is extended or adjusted under 35 U.S.C. 154(b) by 404 days.

(21) Appl. No.: 16/360,952

(22) Filed: Mar. 21, 2019

(65) Prior Publication Data

US 2020/0301445 A1 Sep. 24, 2020

(51) Int. Cl.

*G05D 1/04* (2006.01)
*G05D 1/12* (2006.01)
(Continued)

(52) U.S. Cl.

CPC .......... *G05D 1/042* (2013.01); *B64C 39/024* (2013.01); *G05D 1/12* (2013.01); *G06K 7/10722* (2013.01); *G06K 7/1417* (2013.01); *G06K 19/06037* (2013.01); *G06T 7/73* (2017.01); *B64C 2201/027* (2013.01); *B64C 2201/141* (2013.01); *G06T 2207/10032* (2013.01); *G06T 2207/30204* (2013.01)

(58) Field of Classification Search

None
See application file for complete search history.

(56) References Cited

U.S. PATENT DOCUMENTS 9,056,676 B1 6/2015 Wang
9,964,951 B1 5/2018 Dunn et al.
(Continued)

FOREIGN PATENT DOCUMENTS

WO 2017065411 A1 4/2017

OTHER PUBLICATIONS

International Search Report and Written Opinion, dated Jun. 25, 2020, for corresponding international patent application No. PCT/US2020/020201, 10 pages.

*Primary Examiner* — Jonathan M Dager
*Assistant Examiner* — Garrett F Evans
(74) *Attorney, Agent, or Firm* — Christensen O'Connor Johnson Kindness PLLC

(57) ABSTRACT

Unmanned aerial vehicle (UAV) navigation systems include a UAV charging pad positioned at a storage facility, a plurality of fiducial markers positioned at the storage facility, and a UAV. Each fiducial marker is associated with a fiducial dataset storing a position of the fiducial marker, and each fiducial dataset is stored in a fiducial map. The UAV has a navigation system that includes a camera, a fiducial navigation sub-system, a non-fiducial navigation sub-system, and logic that when executed causes the UAV to image a first fiducial marker with the camera, to transition from a non-fiducial navigation mode to a fiducial navigation mode, to access from the fiducial map the fiducial dataset storing the position of the first fiducial marker, and to navigate based upon the fiducial dataset storing the position of the first fiducial marker, into alignment with and land on the UAV charging pad.

20 Claims, 10 Drawing Sheets

(51) Int. Cl.

| | |
|---|---|
| ***B64C 39/02*** | (2006.01) |
| ***G06T 7/73*** | (2017.01) |
| ***G06K 7/14*** | (2006.01) |
| ***G06K 7/10*** | (2006.01) |
| ***G06K 19/06*** | (2006.01) |

(56) References Cited

U.S. PATENT DOCUMENTS

| | | | | |
|---|---|---|---|---|
| 10,223,666 | B1 | 3/2019 | Palamarchuk et al. | |
| 2005/0090972 | A1 | 4/2005 | Bodin et al. | |
| 2015/0353206 | A1 | 12/2015 | Wang | |
| 2016/0039542 | A1* | 2/2016 | Wang | B64D 39/00 701/2 |
| 2016/0122038 | A1 | 5/2016 | Fleischman et al. | |
| 2017/0011333 | A1 | 1/2017 | Greiner et al. | |
| 2017/0323129 | A1 | 11/2017 | Davidson et al. | |
| 2018/0053139 | A1* | 2/2018 | Stoman | G05D 1/0676 |
| 2020/0130864 | A1* | 4/2020 | Brockers | B64D 47/08 |

* cited by examiner

FIDUCIAL MAP 300c

FIDUCIAL MAP 300b

FIDUCIAL MAP 300a

| FIDUCIAL MARKER # | FIDUCIAL MARKER IMAGE | LATITUDE | LONGITUDE | ALTITUDE | HEADING | ZIP CODE | .... | N |
|---|---|---|---|---|---|---|---|---|
| 1 | a | b | c | d | e | f | g | h |
| 2 | i | j | k | l | m | n | o | p |
| . | q | r | s | t | u | v | w | x |
| . | y | z | aa | bb | cc | dd | ee | ff |
| . | gg | hh | ii | jj | kk | ll | mm | nn |
| . | oo | pp | qq | rr | ss | tt | uu | vv |
| n | ww | xx | yy | zz | aaa | bbb | ccc | ddd |

716
712f
712e
EGRESS POINT
712d
720e
712c
708
720z
728a
720m
720n
704
756
760
748
752
744
728b
720a
712a
720i
INGRESS POINT
712b
700
716

GEO-FIDUCIALS FOR UAV NAVIGATION

TECHNICAL FIELD

This disclosure relates generally to unmanned aerial vehicles (UAVs), and in particular but not exclusively, relates to UAV navigation systems and methods for navigating UAVs.

BACKGROUND INFORMATION

A UAV is a vehicle capable of air travel without a physically-present human operator. UAVs may be provisioned to perform various different missions, including payload delivery, exploration/reconnaissance, imaging, public safety, surveillance, or otherwise. The mission definition will often dictate a type of specialized equipment and/or configuration of the unmanned vehicle.

Safe and efficient UAV navigation relies upon the UAV having an accurate and precise navigation solution (for example, a latitude, longitude, and altitude). For example, a UAV may rely on a global positioning system (GPS) to generate a navigation solution in wide open environments; however, GPS navigation may lack the precision necessary to navigate a UAV in confined or crowded environments (such as an indoor UAV base having numerous UAVs). In addition, weather and other contingencies may degrade GPS signal strength, which may compromise the ability of a UAV to generate an accurate navigation solution by GPS. Some environments may experience degraded GPS performance, for example due to multipath, and others may be completely GPS-denied, i.e., may lack GPS signal altogether. These are merely exemplary scenarios, as other challenges characterize UAV navigation. Ultimately, the ability to generate a reliable, accurate, and precise navigation solution is important to efficient and safe UAV navigation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 3 is a schematic of a fiducial map of the navigation system of FIG. 2.

DETAILED DESCRIPTION

Figure 1A:
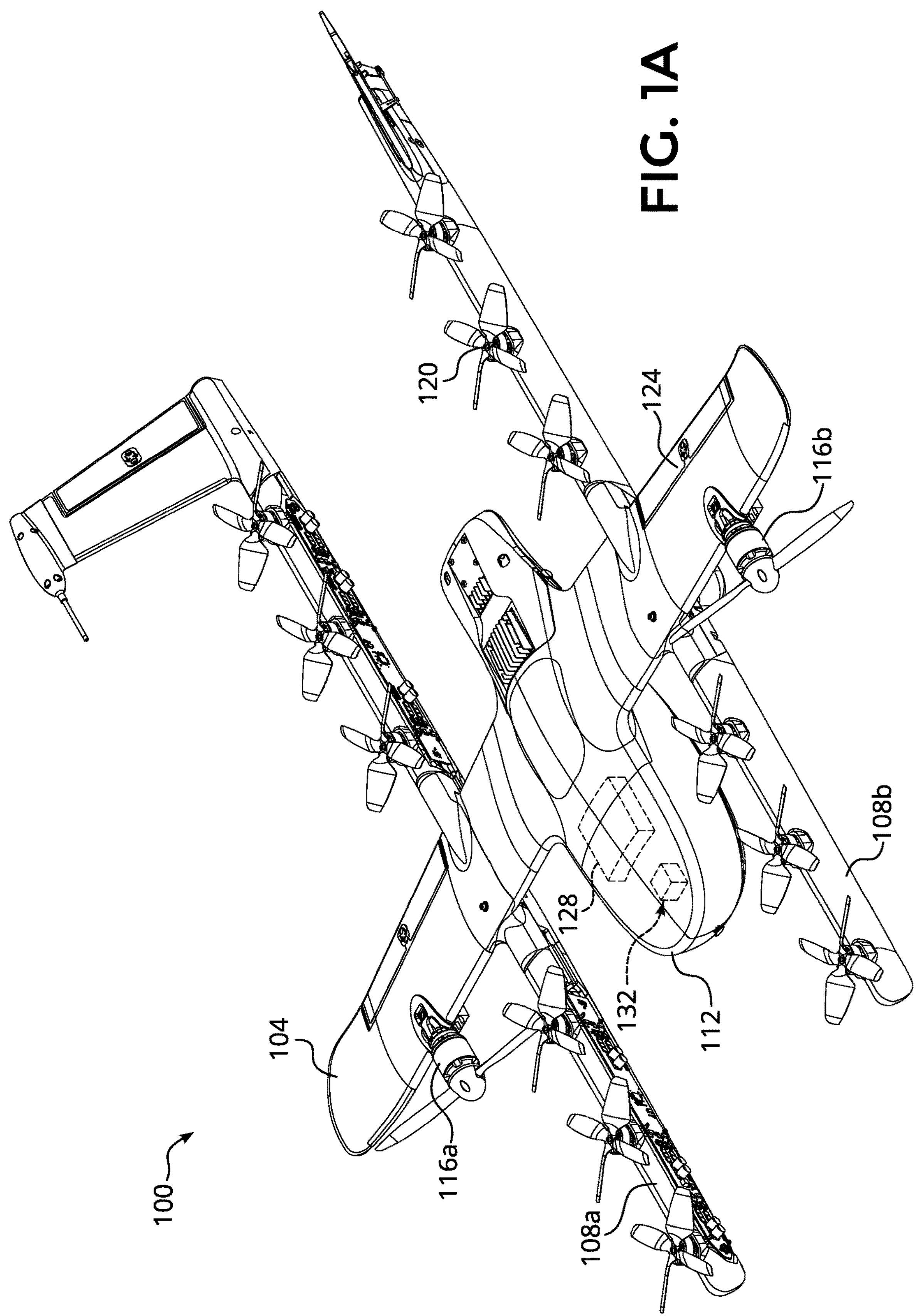
FIG. 1A is a top isometric view of a UAV, in accordance with an embodiment of the disclosure.

Embodiments of a system, apparatus, and method of operation for unmanned aerial vehicle (UAV) navigation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," "an embodiment," or "some embodiments" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure provides systems and methods for navigating UAVs, at least in part by generating a navigation solution based upon using fiducial markers. Advantages described in relation to a particular element, combination of elements, step, or combination or sequence of steps may also follow from other elements and steps. Generally, any feature of the systems and methods described herein is designed to improve UAV navigational accuracy, safety, and/or efficiency.

An unmanned aerial vehicle (UAV) navigation system includes a UAV charging pad positioned at a storage facility, a plurality of fiducial markers positioned at the storage facility, and a UAV. Each fiducial marker of the plurality is associated with a fiducial dataset storing a position of the fiducial marker, and each fiducial dataset is stored in a fiducial map. The UAV has a power source, a propulsion unit operably coupled with the power source, and a navigation system coupled to the propulsion unit. The navigation system includes a camera, a fiducial navigation sub-system, a non-fiducial navigation sub-system, and logic that when executed causes the UAV to: image a first fiducial marker of the plurality with the camera; transition from a non-fiducial navigation mode in which the UAV navigates without aid of the fiducial navigation sub-system, to a fiducial navigation mode in which the UAV navigates at least partially based upon the fiducial navigation sub-system; access, from the fiducial map, the fiducial dataset storing the position of the first fiducial marker; and navigate, based upon the fiducial dataset storing the position of the first fiducial marker, into alignment with and land on the UAV charging pad.

In some embodiments, the plurality of fiducial markers includes a first fiducial marker positioned adjacent to a first side of the UAV charging pad, and a second fiducial marker positioned adjacent to a second side of the UAV charging pad, to enable imaging of at least one of the first or second fiducial markers by the camera immediately prior to landing. Some embodiments also include a third fiducial marker positioned adjacent to the first fiducial marker and radially outward from the UAV charging pad, and a fourth fiducial marker positioned adjacent to the second fiducial marker and radially outward from the UAV charging pad, wherein the first and second fiducial markers are smaller than the third and fourth fiducial markers to enable imaging of at least one of the first or second fiducial markers from an altitude at which the third and fourth fiducial markers are outside a field of view of the camera. In some embodiments, the first, second, third, and fourth fiducial markers are each associated with a common heading, to assist the UAV to navigate into alignment with and land on the UAV charging pad. Some embodiments include a fifth fiducial marker positioned adjacent to a third side of the UAV charging pad and a sixth fiducial marker positioned adjacent to a fourth side of the UAV charging pad, to enable imaging of at least one of the first, second, fifth or sixth fiducial markers by the camera immediately prior to landing. In some embodiments, the UAV charging pad is a first UAV charging pad, and the UAV navigation system further includes a second UAV charging pad separated from the first UAV charging pad by a seventh fiducial marker that is larger than the first and third fiducial markers, to enable the UAV to determine a navigation solution based on the seventh fiducial marker before the camera can image the first and third fiducial markers.

Some embodiments include a third fiducial marker and a fourth fiducial marker positioned adjacent to an access point through a perimeter of the storage facility. In such embodiments, the UAV may include further logic that, when executed causes the UAV to: image at least one of the third fiducial marker or the fourth fiducial marker; access, from the fiducial map, the fiducial dataset storing the position of the at least one imaged third or fourth fiducial marker; and navigate through the access point based upon the fiducial dataset storing the position of the at least one imaged third or fourth fiducial marker.

In some embodiments, the first fiducial marker is adjacently surrounded by a contrasting region having an overall border gray value that is no darker than a fiducial gray value of the first fiducial marker.

In some embodiments, the UAV is a first UAV, and the UAV navigation system also includes a second UAV having a UAV fiducial marker associated with a dynamic fiducial dataset storing a real-time position of the UAV fiducial marker in the fiducial map. In such embodiments, the first UAV includes further logic that when executed causes the first UAV to: image the UAV fiducial marker of the second UAV with the camera; access, from the fiducial map, the dynamic fiducial dataset storing the real-time position of the UAV fiducial marker; and navigate around the second UAV based upon the real-time position of the UAV fiducial marker.

In some embodiments, the UAV navigation system includes further logic that, when executed causes the UAV to: store a UAV position of the UAV acquired immediately prior to landing on the UAV charging pad or while landed on the UAV charging pad; monitor the UAV position while landed to detect a threshold motion level after the UAV lands; and invalidate the UAV position if the threshold motion level is detected.

In some embodiments, the UAV navigation system includes further logic that, when executed causes the UAV to: determine, while the UAV navigates within a fiducial navigation zone, a first navigation solution utilizing the fiducial navigation system, and a second navigation solution utilizing the non-fiducial navigation system; validate the second navigation solution against the first navigation solution to determine if the non-fiducial navigation system has a required position accuracy; and navigate outside the fiducial navigation zone utilizing the non-fiducial navigation system if the non-fiducial navigation system has the required position accuracy.

In some embodiments, the UAV navigation system includes further logic that, when executed causes the UAV to: execute a test flight plan that includes taking off from the UAV charging pad; determine a navigation solution based upon the fiducial navigation sub-system while the UAV hovers over the UAV charging pad; and land on the UAV charging pad.

In some embodiments, the fiducial map is a first fiducial map corresponding to a first geographic area, and the UAV includes further logic that, when executed causes the UAV to replace the first fiducial map with a second fiducial map corresponding to a second geographic area when the UAV operates in the second geographic area. In some embodiments, the first fiducial map and the second fiducial map each store an identical fiducial marker code.

In some embodiments, the plurality of fiducial markers includes a first fiducial marker, a second fiducial marker, a third fiducial marker, and a fourth fiducial marker, all positioned adjacent to and on different sides of the UAV charging pad. In such embodiments, imaging the fiducial marker includes imaging the first fiducial marker, the second fiducial marker, the third fiducial marker, and the fourth fiducial marker, and navigating includes determining a navigation solution of the UAV based upon a position of the first fiducial marker, a position of the second fiducial marker, a position of the third fiducial marker, and a position of the fourth fiducial marker.

In some embodiments, the storage facility exists within a fiducial navigation zone inside which the UAV may not utilize a global positioning system to navigate. In such embodiments, transitioning to the fiducial navigation mode occurs inside the fiducial navigation zone, and the fiducial navigation mode does not allow the UAV to utilize the global positioning system.

In another aspect, an unmanned aerial vehicle (UAV) navigation method includes: positioning a plurality of fiducial markers around a UAV charging pad in a storage facility, each fiducial marker of the plurality being associated with a fiducial dataset storing a position of the fiducial marker; imaging a first fiducial marker of the plurality using a fiducial navigation sub-system of a UAV, the UAV having a navigation system including the fiducial navigation sub-system and a non-fiducial navigation sub-system; transitioning the UAV from a non-fiducial navigation mode in which the UAV does not navigate based upon the fiducial navigation sub-system, to a fiducial navigation mode in which the UAV navigates at least partially based upon the fiducial navigation sub-system; accessing, from a fiducial map stored onboard the UAV, the fiducial dataset storing the position of the first fiducial marker; and navigating the UAV, based upon the fiducial dataset storing the position of the first fiducial marker, into alignment with and landing on the UAV charging pad.

In some embodiments, the plurality of fiducial markers includes a first group of fiducial markers positioned around the UAV charging pad and a second group of fiducial markers positioned around an access point into the storage facility. In such embodiments, navigating the UAV may include navigating through the access point based upon the second group of fiducial markers. In some embodiments, the plurality of fiducial markers includes a third group of fiducial markers positioned outside the storage facility and proximal to the access point. In such embodiments, navigating may include navigating to the access point based upon the third group of fiducial markers.

In some embodiments, the fiducial map is a first fiducial map associated with a first geographical area. In such embodiments, the UAV may determine, based on a geographical position of the UAV retrieved using the non-fiducial navigation sub-system, whether the UAV is located in a second geographical area, and may replace the first fiducial map with a second fiducial map if the UAV is located in the second geographical area. In some embodiments, the first and second fiducial maps may each store an identical fiducial marker code.

The following disclosure will discuss the embodiments described above, and other embodiments, as they relate to the figures.

FIG. 1A is a top isometric view of a UAV 100 in accordance with an embodiment of the disclosure. The UAV includes a wing 104, booms 108*a*, 108*b*, and a fuselage 112. In some embodiments, the wing 104 carries horizontal propulsion units (e.g., 116), and the booms carry vertical propulsion units (e.g., 120). In some embodiments, a propulsion unit may provide both horizontal and vertical propulsion. The UAV includes control surfaces (e.g., 124*a* and 124*b*), which may include ailerons, spoilers, tailerons, rudders, ruddervators, slats, and/or flaps, for improved control of the UAV 100. A power source 128, such as a battery (e.g., a rechargeable lithium ion battery) provides power for the propulsion units. The power source 128 may be stored within the fuselage 112. In some embodiments, the fuselage 112 also includes one or more compartments or bays, such as an avionics bay 132.

Figure 1B:
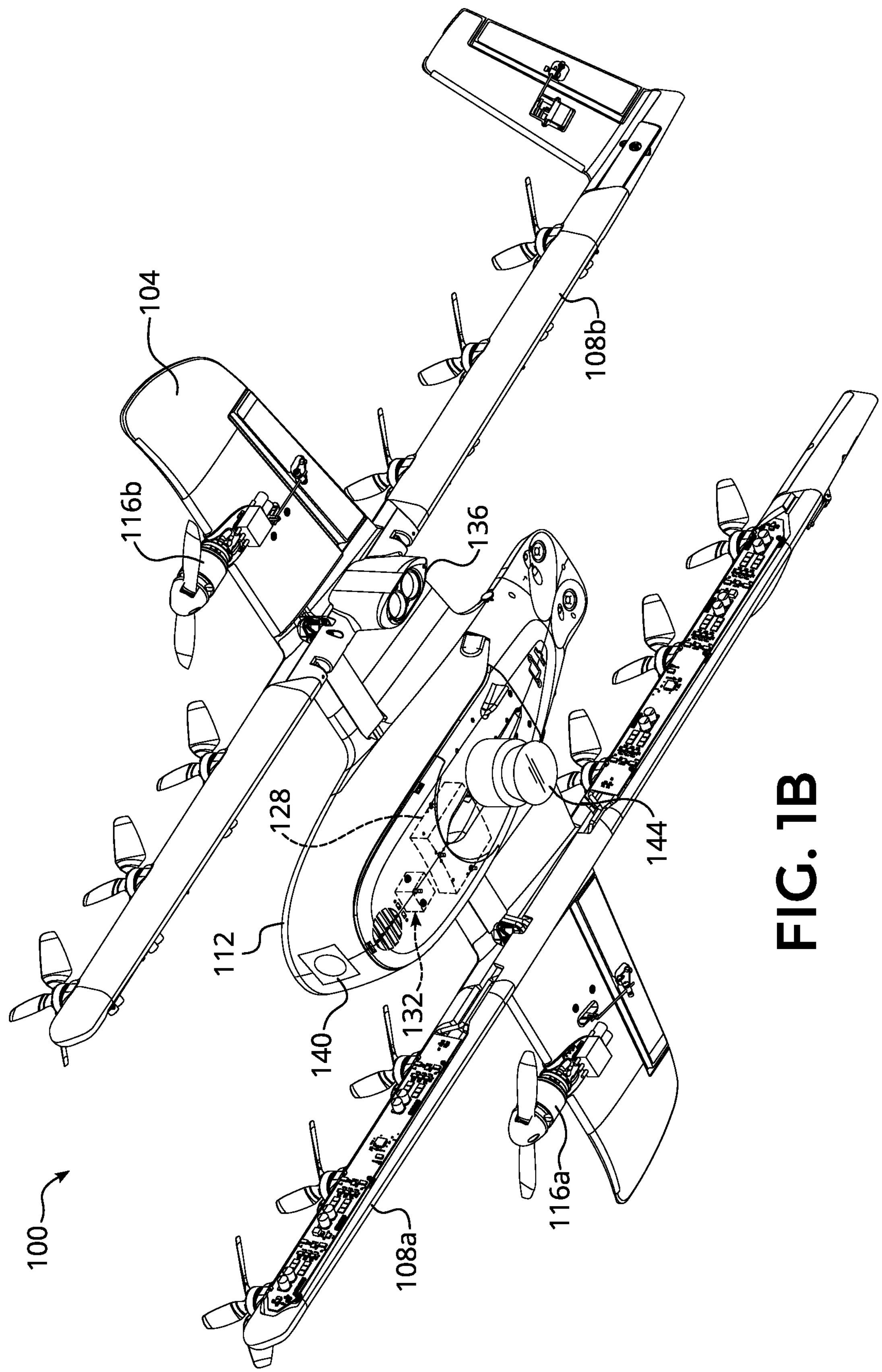
FIG. 1B is a bottom isometric view of a UAV, in accordance with an embodiment of the disclosure.

FIG. 1B is a bottom isometric view of the UAV 100 of FIG. 1A. The UAV 100 includes a charging interface 136 on a bottom side thereof that is configured to interface with an inductive charging surface of a UAV charging pad (described below). The charging interface 136 may be electrically connected to the power source 128 such that the UAV charging pad recharges the power source 128 via the charging interface 136 when the UAV 100 is landed. The UAV 100 includes a camera 140, which forms part of a navigation system, described below. The illustrated camera 140 is located on a forward portion of the fuselage 112; however, this location is non-limiting. In some embodiments, the camera 140 may be located in another location, e.g., a rearward portion of the fuselage 112. Further, in some embodiments, the camera 140 may include a plurality of cameras, e.g., 1-5 cameras. It is therefore understood that UAVs of the present disclosure may exhibit the functionality of camera 140 with more than one camera. One purpose of the camera 140 is to image fiducial markers as part of a fiducial navigation sub-system, described below. In some embodiments, the camera 140 may form part of additional or alternative systems, including a public safety system, a surveillance system, and an imaging system. The camera 140 may have a field of vision of about 60 degrees to about 120 degrees, e.g., about 90 degrees. The camera 140 may be a digital camera that operates within the visible spectrum of light, infrared spectrum, and/or other spectrum. For example, in some embodiments, the camera 140 may operate within the infrared spectrum when operating at night or within the ultraviolet spectrum when operating in cloudy weather. In some embodiments, the UAV 100 may include more than one camera 140. The UAV also includes a delivery unit 144 for handling external payloads.

In some embodiments, the camera 140 has a fixed orientation, e.g., a ground-facing direction or a forward-looking direction. In some embodiments, the camera 140 is carried by a mechanism configured to adjust the orientation of the camera 140 based on one or more inputs. For example, in some embodiments, the camera 140 may be supported by a pivot mechanism that adjusts the camera 140 orientation based upon input from a navigation system (described below) and/or another device or system. For example, in response to the input from the navigation system, the pivot mechanism may orient the camera 140 toward the ground, wall, or other direction in order to capture one or more fiducial markers within the camera's field of view.

To facilitate understanding, the foregoing reference numerals are generally used throughout the disclosure in relation to UAVs, including in embodiments with more than one UAV or different UAVs.

Figure 2:
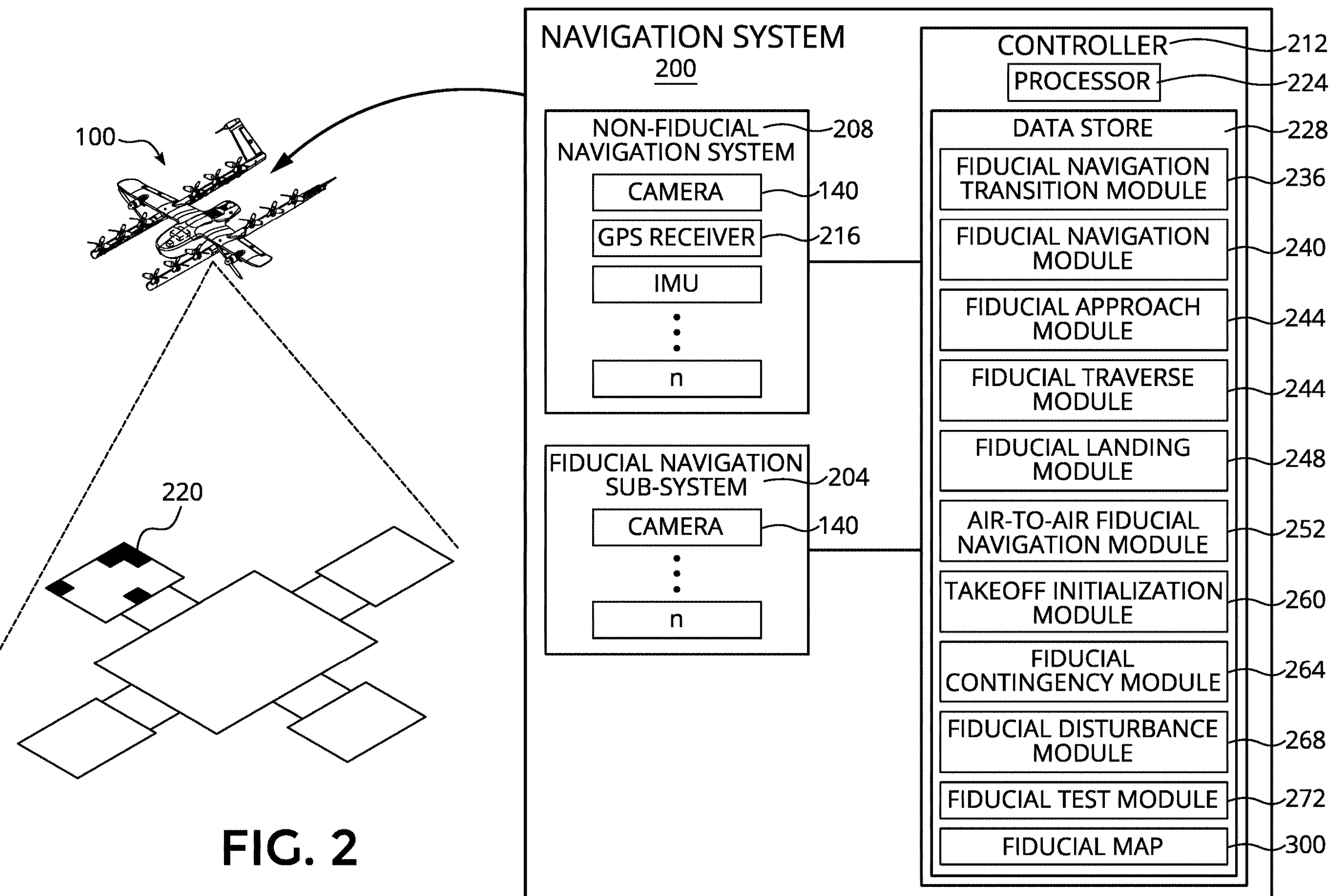
FIG. 2 is a schematic of a navigation system of the UAV of FIGS. 1A-1B.

FIG. 2 illustrates the UAV 100 navigating utilizing the afore-mentioned navigation system 200, which assists the UAV 100 to navigate in a variety of environments, including relatively open environments (such as outdoors), relatively confined environments (such as indoors), and relatively crowded or busy environments (such as inside a UAV storage facility having confined airspace containing a number of UAVs). The navigation system 200 assists the UAV 100 to navigate between waypoints (e.g., between a UAV storage facility and a delivery destination) and also to perform precise navigational tasks, such as landing, taking off, entering and exiting structures, avoiding terrestrial and airborne obstacles, executing flight plans, testing on-board systems, etc. The navigation system 200 may include elements that are located entirely on-board the UAV 100 (e.g., located in the avionics bay 132, supported by the booms 108*a* and 108*b*, supported by the wing 104, and/or located in other on-board locations). In some embodiments, the navigation system 200 may also include elements that are located remote from the UAV 100 (e.g., a remote control "tower").

The navigation system 200 includes two primary subsystems: a fiducial navigation sub-system ("FNS") 204 and a non-fiducial navigation sub-system ("NFNS") 208, both of which are aided by a controller 212. The navigation system 200 may utilize an extended Kalman filter ("EKF") and/or other algorithm to transition between the FNS 204 and the NFNS 208, including transitioning between various navigational instruments of either sub-system. In some embodiments, the FNS 204 and the NFNS 208 may share one or more instruments. For example, the FNS 204 and the NFNS 208 share the controller 212 and camera 140 in the embodiment of FIG. 2.

The NFNS 208 includes hardware and logic that enables the UAV 100 to determine its navigation solution utilizing methods that do not rely on fiducial markers (e.g., GPS, visual odometry, dead reckoning, etc.). As used in this application, "navigation solution" may include any combination of a latitude, longitude, altitude, speed, velocity, true heading, and/or other navigation information. For example, in some embodiments, a navigation solution may include a latitude, longitude, and altitude. In some embodiments, a navigation solution may also include a latitude, longitude, altitude, and heading. The primary elements of the NFNS 208 include a GPS receiver 216 and the controller 212. The illustrated embodiment also includes the camera 140. Some embodiments may additionally or alternatively include additional navigation elements, such as an inertial measurement unit (IMU), an accelerometer, a gyroscope, a magnetometer, a barometer, a compass, and potentially other instruments.

The FNS 204 includes hardware and logic that enables the UAV 100 to determine its navigation solution (including its latitude, longitude, altitude, and heading) based upon periodically imaging one or more fiducial markers, such as fiducial marker 220. The UAV 100 may navigate entirely using the FNS 204, or may navigate using both the FNS 204 and the NFNS 208. For example, the UAV 100 may use the FNS 204 to initialize its navigation solution upon take-off based upon the fiducial marker 220, and may thereafter update its navigation solution using the FNS 204 as it images different fiducial markers. The primary elements of the FNS 204 include the camera 140 and the controller 212 (both of which are shared with the NFNS 208). The camera 140 images fiducial markers and provides images to the controller 212 for processing and analysis in order to determine the UAV's navigation solution. In some embodiments, the FNS 204 may include additional cameras and other instruments.

As used in this disclosure, a fiducial marker is a reference point that "marks" a known geographical location such as a latitude, longitude, and altitude, and may also represent other known information, including a heading, zip code, or other information. A fiducial marker is uniquely identifiable by the UAV navigation system 200, and the UAV 100 may utilize the information associated with a fiducial marker to triangulate or otherwise determine its own navigation solution with high accuracy. Using fiducial marker 220 as an example, each fiducial marker is associated with a unique set of spatial coordinates (such as an altitude, latitude, and longitude). In this sense each fiducial marker is a "geo" fiducial marker. Each fiducial marker may be associated with additional information, for example a zip code, a true heading, and/or other information. A fiducial marker may represent its associated geographical information in a variety of ways, for example as a code including a 2-D bar code, a 2-D quick response ("QR") code, a 3-D code, a pattern of time-correlated flashing visible light or other electromagnetic signals, etc. Fiducial marker **504*f* of FIG. 5** is representative of a fiducial marker visual code or appearance. One representative and non-limiting fiducial marker system is the AprilTags Visual Fiducial System managed and made available by the University of Michigan. The AprilTags System provides a library of 2-D patterns that can be associated with precise geographical information. Each 2-D pattern may then be affixed to the physical location corresponding to the information represented by the 2-D pattern, and is recognizable by UAV cameras of the present disclosure.

Fiducial markers may have a variety of sizes and shapes. Because cameras have a limited field of view (e.g., 90 degrees), limited focus capabilities, and limited zoom capabilities, larger fiducial markers are more easily imaged from higher altitudes and further distances than smaller fiducial markers, all else equal. Likewise, smaller fiducial markers are more easily imaged from lower altitudes and closer distances, all else equal. Thus, it may be advantageous to provide fiducial markers having different sizes, for example large, medium, and small fiducial markers to enable navigation by UAV from a range of heights. Specific examples are described below. As used in this disclosure, a "large" fiducial marker generally has a 2-D area of at least about 2000 $cm^2$, for example 2500 $cm^2$, 4000 $cm^2$, 5000 $cm^2$, and greater. As used in this disclosure, a "medium" fiducial marker generally has a 2-D area of between about 500 $cm^2$ and about 2000 $cm^2$, inclusive, for example 750 $cm^2$, 1000 $cm^2$, 1500 $cm^2$ and any other value in that range. As used in this disclosure, a "small" fiducial marker generally has a 2-D area of less than about 500 $cm^2$, for example 400 $cm^2$, 250 $cm^2$, 100 $cm^2$, and any other value in that range. The size ranges are exemplary, and intended to facilitate understanding of the inventive concepts. When utilized in UAV fiducial navigation systems of the present disclosure, large fiducial markers may generally be imaged with a camera from an altitude or distance of about 10-20 meters (e.g., about 12 or 15 meters); medium fiducial markers may generally be imaged from an altitude or distance of about 5-10 meters (e.g., about 6 meters); and small fiducial markers may generally be imaged from an altitude or distance of about 1-5 meters (e.g., about 3 meters). Rectangular fiducial markers are generally illustrated in the FIGURES of this disclosure, however this is merely exemplary. Fiducial markers having many other shapes are contemplated.

The controller 212 comprises part of the navigation system 200 and forms part of both the FNS 204 and the NFNS 208. In some embodiments, the controller 212 is configured to control additional systems of the UAV, such as the propulsion units 116, 120, the power source 128, the control surfaces 124, etc. The controller 212 includes a processor 224 (e.g., general processing units, graphical processing units, application specific integrated circuits); a data store 228 (a tangible machine readable storage medium); and modules that may be implemented as software logic (e.g., executable software code), firmware logic, hardware logic, or various combinations thereof. The controller 212 may include a communications interface having circuits configured to enable communication with remote server, other UAV, base station, or other network element via the internet, cellular network, RF network, Personal Area Network (PAN), Local Area Network, Wide Area Network, or other network. Accordingly, the communications interface may be configured to communicate using wireless protocols (e.g., WIFI®, WIMAX®, BLUETOOTH®, ZIGBEE®, Cellular, Infrared, Nearfield, etc.) and/or wired protocols (Universal Serial Bus or other serial communications such as RS-234, RJ-45, etc., parallel communications bus, etc.). In some embodiments, the communications interface includes circuitry configured to initiate a discovery protocol that allows the UAV and other network element to identify each other and exchange control information. In an embodiment, the communications interface has circuitry configured to a discovery protocol and to negotiate one or more pre-shared keys. In an embodiment, the communications interface alternatively or additional includes circuitry configured to initiate a discovery protocol that allows an enterprise server and the UAV to exchange information.

As used in this disclosure, a data store is a tangible machine-readable storage medium that includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The data store 228 of the controller 212 of FIG. 2 stores a fiducial map 300 and a plurality of logic modules that, when executed, cause the UAV to perform operations utilizing the FNS 204, including a fiducial navigation transition module 236, a fiducial navigation module 240, a fiducial approach module 244, a fiducial traverse module 248, a fiducial landing module 252, a fiducial initialization module 256, an air-to-air fiducial navigation module 260, a fiducial contingency module 264, a fiducial disturbance module 268, and a fiducial test module 272, which are described below after introducing exemplary aspects and operating environments of the UAV 100.

The fiducial map 300 stores information associated with each fiducial marker, which may be represented by the table of FIG. 3. The fiducial map 300 includes information for a population of fiducial markers, including for each individual fiducial marker. For each individual fiducial marker, the fiducial map includes a unique fiducial dataset or "line item" (e.g., line item 304*a* and 304*b*) storing a code associated with an image of the fiducial marker, a latitude, and longitude of that fiducial marker. In some embodiments, the fiducial map 300 may also include an altitude, a heading, a zip code, and/or other information associated with one or more individual fiducial markers.

The fiducial marker library relied upon by the FNS 204 (for example, the AprilTags library) may include a finite number of fiducial markers. For this reason, it may be advantageous to reuse the same fiducial marker image in more than one location. Thus, different fiducial maps 300 (e.g., fiducial maps for two different area codes) may each include a fiducial dataset or "line item" 304 having a common fiducial marker image or visual code. In such embodiments, the fiducial map 300 may correspond to a particular geographic location (e.g., a particular zip code or area code) or a particular flight plan; in such cases, there may be a plurality of fiducial maps (e.g., 300*b* and 300*c*), one for each geographic location or flight plan. Accordingly, the controller 212 may update to a different fiducial map 300 when moving between two geographic locations or changing flight plans, e.g., from 300*b* to 300*c*. In some embodiments, the plurality of fiducial maps 300*a*-300*c* may be uploaded initially to the UAV 100. In some embodiments, a primary fiducial map (e.g., 300*a*) may be uploaded initially, and a secondary fiducial map (e.g., 300*b*) may be uploaded at a later time (e.g., during flight). In some embodiments, a single fiducial map 300 may include more than one unique fiducial dataset "line item" having a common fiducial marker image or visual code, with each unique fiducial dataset having a different geographic location (e.g., a particular zip code or area code). In operation, the UAV 100 can retrieve its current geographical location by GPS, RF signal, or other means, thereby enabling the UAV 100 to either update its fiducial map 300 to the fiducial map 300 corresponding to its geographic location or to positively identify an imaged fiducial marker by finding, in its fiducial map 300, the unique fiducial dataset or "line item" 304 containing both the correct code associated with the fiducial marker image and the correct geographic code. In some embodiments, the UAV 100 can receive a mission that provides a flight plan, one or more fiducial maps 300, and also instructions as to which fiducial map (e.g., 300*a*-300*c*) should be used at which point in the flight plan. In such embodiments, the UAV 100 may switch between fiducial maps (e.g., 300*a*-300*c*) at different points along a flight plan, and/or may update its fiducial maps if the flight plan is updated.

Figure 4:
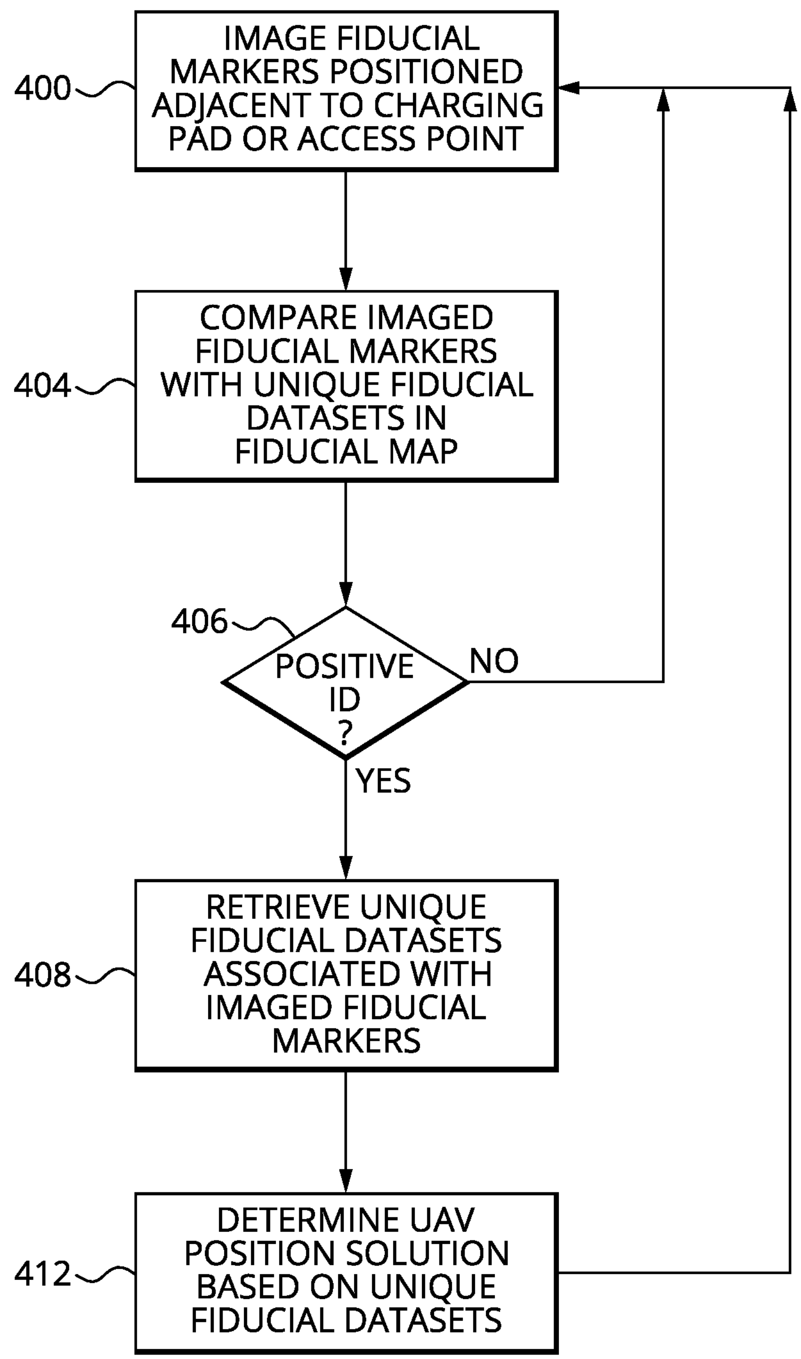
FIG. 4 is a flow chart showing a method of navigating using the navigation system of FIG. 2.

FIG. 4 illustrates an exemplary method for navigating a UAV utilizing the FNS. At step 400, the UAV's camera 140 images a fiducial marker (such as fiducial marker 220 from FIG. 2). In some embodiments, the camera 140 may simultaneously image more than one fiducial marker, such as a plurality of fiducial markers positioned near a UAV charging pad or structural access point. At step 404, the controller 212 compares the image(s) captured by the camera 140 to unique fiducial datasets in the fiducial map 300 (for example, to codes associated with fiducial marker images), and if a match is made, positively identifies the imaged fiducial marker(s) with unique fiducial dataset(s) in the fiducial map 300. In some embodiments, the controller 212 may compare additional information from the fiducial map 300 (e.g., a zip code) to reference information (e.g., a UAV's current geographic location based upon GPS). At step 408, once the imaged fiducial marker(s) are positively identified in the fiducial map 300, then the controller 212 retrieves the unique fiducial dataset(s) associated with the positively identified fiducial marker(s) from the fiducial map 300, thereby informing the UAV 100 of the imaged fiducial marker's geographical position (and potentially other information). The controller 212 may retrieve information from the fiducial map 300 in whole or in part, including any unique fiducial dataset ("line item") in whole or in part, to facilitate execution of any logic module described herein. At step 412, the UAV 100 determines its own navigation solution based at least in part upon the known position of the imaged fiducial marker, analysis of the image (e.g., analyzing the size and position of the fiducial marker in the image), and/or input from one or more instruments (e.g., pitch and roll of camera 140). In some embodiments, the UAV 100 may determine its navigation solution utilizing the FNS 204 alone. In some embodiments, the UAV 100 may determine its navigation solution utilizing the FNS 204 and the NFNS 208, e.g., by utilizing the FNS navigation solution as an additional input into the NFNS 208 to determine the navigation solution. Thereafter, the FNS 204 executes one or more actions based upon its navigation solution, such as guiding the UAV 100 toward or away from the imaged fiducial marker(s). In some embodiments, the fiducial map 300 may be updated to reflect the most current fiducial marker information, e.g., by periodic software update transmitted to the UAV 100 by a remote controller system.

The foregoing elements of the FNS 204 have numerous practical applications. For example, fiducial markers may be positioned around a UAV landing pad or charging pad to facilitate precision landing. In some embodiments, fiducial markers may be positioned around building access points (e.g., windows and/or doors) to facilitate ingress and egress of UAVs relative to the building. In some embodiments, fiducial markers may be positioned along flight paths or within fiducial navigation zones, such as in GPS-degraded areas or in areas where a higher degree of navigational precision is necessary. In some embodiments having a plurality of UAVs, fiducial markers may be located on each UAV in order to de-conflict UAV traffic and to prevent mid-air collisions. In some embodiments, fiducial markers may be associated with known obstacles or threats in order to avoid UAV and payload losses. These are merely exemplary applications that enable a UAV to determine a navigation solution based upon imaging fiducial markers.

Figure 5:
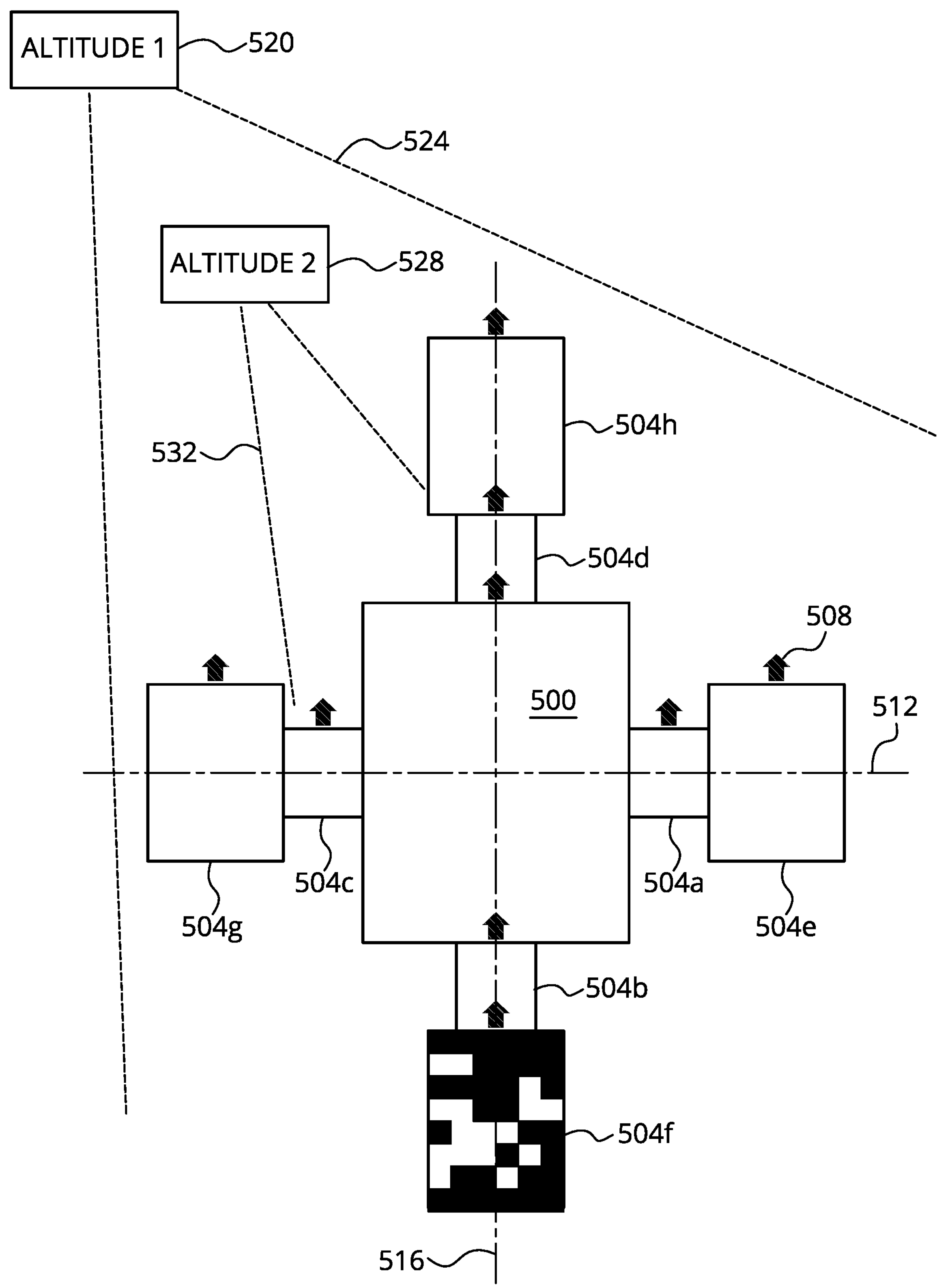
FIG. 5 illustrates a UAV charging pad in accordance with an embodiment of the disclosure.

FIG. 5 illustrates an exemplary UAV charging pad 500 and fiducial marker arrangement configured to facilitate precision UAV landings. Fiducial navigation systems of the present disclosure work with UAV charging pads 500 and landing pads, although charging pads are generally referred to. The centrally-located UAV charging pad 500 doubles both as a landing pad and a charging station for a UAV 100, such as through inductive charging via the UAV's charging interface 136. In this non-limiting embodiment, the UAV charging pad 500 is a rectangle having a side length of approximately 100 cm. In some embodiments, the UAV charging pad 500 may have a side length of about 25 cm to about 150 cm or greater. In some embodiments, the UAV charging pad 500 may have a different shape, e.g., a rectangle, a hexagon, an octagon, a circle, etc.

In use, the UAV 100 may have a flight plan loaded onto its controller 212 that includes the position of the charging pad 500 (e.g., latitude, longitude, and altitude). Fiducial markers 504*a*-504*h* are positioned around the UAV charging pad 500 in a pattern that assists the UAV 100 to land on the UAV charging pad 500 using the FNS 204 to determine its navigation solution with high accuracy as it navigates toward and approaches the UAV charging pad 500. Fiducial marker 504*f* exhibits a representative fiducial marker visual code or appearance. Every other fiducial marker including fiducial markers 504*a*-504*e* and 504*g*-504*h*, and other fiducial markers in this application, may have a similar visual code or appearance. In some embodiments, an identical visual code may be reused elsewhere (e.g., a different geographic area). For simplicity of communication, only fiducial marker 504*f* is shown with an actual fiducial marker visual code. To clarify, the fiducial markers 504*a*-504*h* may not be tied to the charging pad 500 per se; rather, each is associated with its own geographic position (including latitude, longitude, altitude, and in some embodiments, heading). In particular, the fiducial markers 504*a*-504*h* are selected for their size, and are positioned in a particular manner, to enable the FNS 204 to image the fiducial markers 504*a*-504*h* and triangulate the UAV's navigation solution. In the illustrated embodiment, each fiducial marker 504*a*-504*h* is oriented such that all fiducial markers 504*a*-504*h* have a common heading (indicated by arrow 508), in order to provide the FNS 204 an additional reference point to determine a navigation solution (e.g., to assist with determining its velocity or orientation). For example, the heading may enable the controller 212 to determine the UAV's velocity as part of its navigation solution, to determine a correct orientation for the UAV prior to landing, and/or for other advantage. In some embodiments, not all fiducial markers have a common heading.

Fiducial markers 504*a*-504*d* are each small fiducial markers having a side length of about 10-20 cm (e.g., 16 cm), which enables them to be imaged by the UAV camera from an altitude or distance of approximately 5 m or less (e.g., 3 m). Each small fiducial marker 504*a*-504*d* is positioned adjacent to a different edge of the UAV charging pad 500, i.e., within about 1 meter from the charging pad, e.g., within 20 cm, within 10 cm, within 1 cm, or even touching. In particular, small fiducial markers 504*a* and 504*c* are positioned adjacent to opposite edges of the UAV charging pad 500, and are aligned along a first axis 512. Similarly, small fiducial markers 504*b* and 504*d* are each positioned adjacent to different opposite sides of the charging pad 500, along a second axis 516 (which is perpendicular to the first axis 512 in the illustrated embodiment, but need not be). Advantageously, the adjacent placement of the small fiducial markers 504*a*-504*d* relative to the charging pad 500 allows the field of view of camera 140 to encompass at least one small fiducial marker 504*a*-504*d* immediately prior to the UAV 100 landing (e.g., at an altitude of about 5 meters or less, about 3 meters or less, or within about 30 seconds of landing), even if one or more fiducial markers 504*a*-504*d* is obscured or occluded from view of the camera 140 (e.g., by a shadow or due to the pitch and/or roll of the camera 140). This allows the UAV 100 to determine its navigation solution based upon at least one of the fiducial markers 504*a*-504*d* immediately prior to landing.

In some embodiments, the adjacent placement of small fiducial markers 504*a* and 504*c* relative to charging pad 500 allows the FNS 204 to determine that the UAV charging pad 500 is located between fiducial markers 504*a* and 504*c*. In some embodiments, because fiducial markers 504*a* and 504*c* have the same positioning relative to the charging pad 500, the FNS 204 can determine that the charging pad 500 is centrally located between fiducial markers 504*a* and 504*c*. In some embodiments, the FNS 204 can determine the location of the charging pad 500 in two dimensions: along the first axis 512 and the second axis 516, i.e., at the intersection of the two axes in this embodiment. In some embodiments, fiducial markers are only positioned along a first axis (i.e., some embodiments may only include fiducial markers 504*a* and 504*c*, or only 504*b* and 504*d*). In some embodiments, one or more axes connecting two fiducial markers may be oriented diagonally or in another orientation relative to the charging pad 500, and do not necessarily need to be perpendicular to the edges of the fiducial marker.

Referring still to FIG. 5, medium-sized fiducial markers 504*e*-504*h* have a side length of about 20-40 cm (e.g., about 32 cm), are positioned adjacent to the small fiducial markers 504*a*-504*d*, are positioned further away from the charging pad relative to small fiducial markers 504*a*-504*d*, and facilitate higher-altitude imaging by the UAV camera, e.g., at altitudes of about 6 m. The medium-sized fiducial markers 504*e* and 504*g* are located along the first axis 512 and adjacent to (touching, in this embodiment) the small fiducial markers 504*a* and 504*c*, respectively, to enable the FNS 204 to first image the medium-sized fiducial markers 504*e*-504*h*, and then to image the small fiducial markers 504*a*-504*d* as it descends toward the charging pad and the medium-sized fiducial markers fall outside the field of view of the camera 140. Similarly, the small fiducial markers 504*b* and 504*d* are located along the second axis 516 and adjacent to (touching) the medium-sized fiducial markers 504*f* and 504*h*, respectively. Each fiducial marker 504*a*-504*h* is oriented in a common direction, such that all fiducial markers have a common heading, to assist the UAV 100 to determine its velocity and/or to orient itself prior to landing.

Some embodiments may include a single size of fiducial markers around the charging pad, e.g., may rely entirely on small or medium fiducial markers. Some embodiments may include fiducial markers of different sizes than shown in the illustrated embodiment, e.g., medium and large fiducial markers, or large and small fiducial markers, or small, medium, and large fiducial markers.

In use, a descending UAV 100 uses its camera 140 to image the charging pad 500. At a first altitude 520 (e.g., 5 meters), the camera field of view 524 encompasses all fiducial markers 504*a*-504*h*. The camera 140 initially images the medium-sized fiducial markers 504*e*-504*h*, which are easier to image clearly from the first altitude 520, as compared to the small fiducial markers 504*a*-504*d*. The FNS 204 then associates the image of each medium-sized fiducial marker 504*e*-504*h* with the corresponding information stored in the fiducial map 300 (e.g., codes associated with an image). After positively identifying the fiducial markers by associating the imaged medium-sized fiducial markers 504*e*-504*h* with the information stored in the fiducial map 300, the controller 212 retrieves the corresponding unique fiducial dataset (each "line item" or part thereof) for each positively identified fiducial marker 504*e*-504*h* from the fiducial map 300. This information provides four geographical reference points and enables the FNS 204 to precisely determine the UAV's 100 navigation solution. With this determination, the FNS 204 can navigate the UAV 100 toward the charging pad 500, or to any desired flight plan coordinate that maintains at least a subset of fiducial markers 504*a*-504*h* in the camera field-of-view.

At a second altitude 528 (e.g., about 2 meters) along the UAV's descent toward the charging pad 500, the medium-sized fiducial markers 504*e*-504*h* eventually fall outside of the field of view 532 of the camera 140. However, because the small fiducial markers 504*a*-504*d* are positioned adjacent to the medium-sized fiducial markers 504*e*-504*h* and closer to the charging pad 500, the camera 140 then images the small fiducial markers 504*a*-504*d*. As with the medium-sized fiducial markers 504*e*-504*h*, the FNS 204 associates the imaged small fiducial markers 504*a*-504*d* with the information stored in the fiducial map 300, positively identifies the small fiducial markers 504*a*-504*d* if possible, and retrieves the corresponding unique fiducial dataset ("line item" or part thereof) for each positively identified fiducial marker 504*a*-504*d* from the fiducial map. This information provides up to four new geographical reference points and enables the FNS 204 to refresh its navigation solution. The UAV 100 may determine its navigation solution based upon any single small fiducial marker 504*a*-504*d*; however, the greater number of small fiducial markers advantageously provides greater redundancy. With this determination, the FNS 204 can navigate the UAV 100 toward the charging pad 500 or to a final flight plan coordinate until it lands on the charging pad 500.

Figure 6:
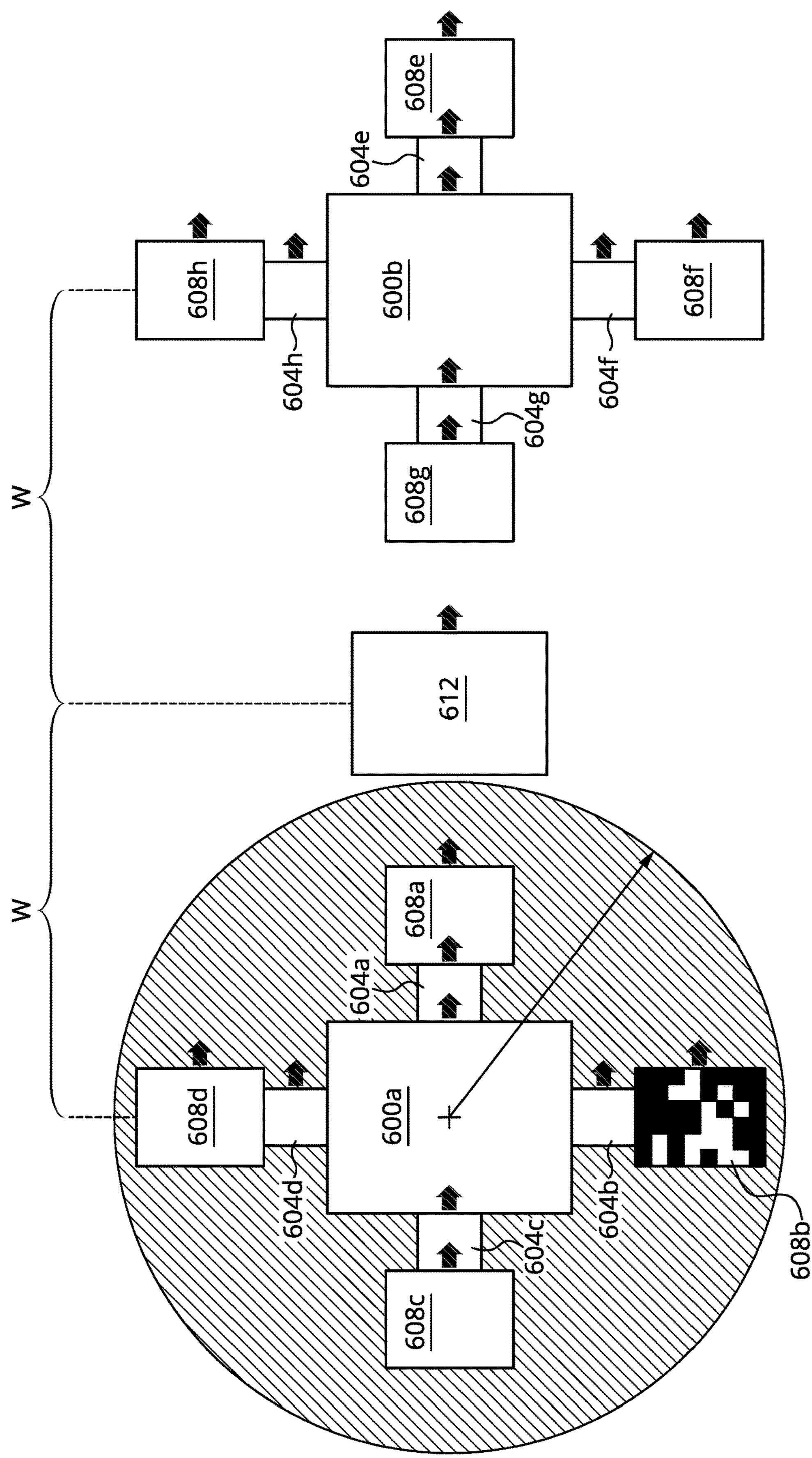
FIG. 6 illustrates an array of UAV charging pads in accordance with an embodiment of the disclosure.

FIG. 6 shows two UAV charging pads 600*a* and 600*b*, which are surrounded by a first group of small fiducial markers 604*a-h* and a second group of medium fiducial markers 608*a-h*, similar to the charging pad 500 of FIG. 5. The two charging pads 600*a* and 600*b* are separated by a large fiducial marker 612 having a side length of about 50 cm to about 100 cm (e.g., about 64 cm or 82 cm), such that it can be imaged by the UAV camera 140 from an altitude of about 12 m. The large fiducial marker 612 marker is spaced apart from each charging pad 600*a*, 600*b* by a width w, which may range from about 2-5 meters. In the illustrated embodiment, w is about 2.5 meters; thus, the two charging pads 600*a*, 600*b* are spaced apart by about 5 meters. The large fiducial marker 612 enables the FNS 204 to accurately determine its navigation solution from a relatively high altitude, so that the UAV 100 can accurately navigate according to its flight plan. In applications having a plurality of charging pads (such as FIG. 6), it may be advantageous to position the large fiducial marker 612 between each charging pad 600*a*, 600*b* in order to prevent the FNS 204 from imaging fiducial markers associated with more than one UAV charging pad. For example, large fiducial markers may be placed at about five meter intervals in a grid-like array. In use, a descending UAV 100 may image the large fiducial marker 612 with its camera 140 from a relatively high altitude, e.g., 10 meters. The large fiducial marker 612 is associated with a unique fiducial dataset ("line item") in the fiducial map 300, and may be associated with an instruction that the UAV 100 should continue descending until it images the medium fiducial markers 608*a*-608*h* and/or small fiducial markers 604*a*-604*h*. The FNS 204 can continue updating its navigation solution in this way, in order to accurately navigate the UAV 100 toward its final flight plan coordinate or the charging pad 600*a* or 600*b*.

In FIG. 6, UAV charging pad 600*a* is surrounded by a contrasting region 616, which is designed to help the UAV camera 140 acquire and image the surrounding fiducial markers 604*a*-604*d*, 608*a*-608*d*. Ordinarily, it may be difficult for the camera 140 to properly expose a fiducial marker if the area surrounding it is relatively dark as compared to the fiducial markers. This scenario may cause the camera 140 to overcompensate for the relatively dark surrounding area by allowing too much light into the image; consequently, the fiducial marker may appear washed out when imaged by the camera 140. This, in turn, can make it difficult for the FNS 204 to associate the imaged fiducial marker with the information stored in the fiducial map, and ultimately make it difficult for the UAV 100 to navigate based upon the imaged fiducial marker.

To mitigate this problem, the contrasting region 616 may have a coloration that does not excessively deviate, as a whole, from the coloration of the fiducial markers 604*a*-604*d*, 608*a*-608*d*. In some embodiments, the contrasting region 616 may be no darker than the fiducial markers 604*a*-604*d*, 608*a*-608*d*. For example, the contrasting region may have a "gray value" that does not exceed a collective gray value of the fiducial markers 604*a*-604*d*, 608*a*-608*d*. For example, if the surface area of each fiducial marker 604*a*-604*d*, 608*a*-608*d* is approximately 50% black and 50% white, then the contrasting region 616 may have a gray value approximately equal to, or not in excess of, about 50% (or 128 on a 256 shade scale). In such a scenario, the contrasting region 616 may be painted (or otherwise colored) such that about 50% of its surface area is black (and no more) and about 50% is white. Alternatively, the contrasting region 616 may have a gray color that reflects a blend of approximately 50% black and 50% white. In some embodiments, the contrasting region 616 may be lighter than the fiducial markers 604*a*-604*d*, 608*a*-608*d* (e.g., about 5% lighter, about 10% lighter, etc.). For example, the charging pad 600*a* may be located on concrete having a particular color having a gray value that is about 5% lighter than the gray value of the fiducial markers 604*a*-604*d*, 608*a*-608*d*. When configured in such a way, the camera 140 can easily adjust to the coloration of the fiducial markers 604*a*-604*d*, 608*a*-608*d* and then image the fiducial markers 604*a*-604*d*, 608*a*-608*d*. The size of the contrasting region 616 may also influence its ability to improve imaging by the camera 140. For example, a fiducial marker having a 16 cm side may be surrounded by a contrasting region having a radius of about 2-3 meters; a fiducial marker having a 32 cm side may be surrounded by a contrasting region having a radius of about 4-9 meters; a fiducial marker having a 64 cm side may be surrounded by a contrasting region having a radius of about 10-15 meters. In some embodiments, the contrasting region may surround a single fiducial marker. In some embodiments, the contrasting region may surround a plurality of fiducial markers, whether those fiducial markers are associated with UAV charging pads, structural access points, or otherwise.

In some embodiments, variations of the fiducial marker arrangements and the precision landing methods described above and shown in FIGS. 5-6 can be applied to enable the UAV to traverse structural access points, e.g., doors and windows. For example, a group of small fiducial markers may be positioned around and adjacent to a window of a storage facility (e.g., one fiducial marker adjacent to each edge of the window, or adjacent to each corner), similar to the small fiducial markers 504*a*-504*d* of FIG. 5. A second group of medium-sized fiducial markers (or large fiducial markers) may also be positioned around the window, similar to fiducial markers 504*e*-504*h* of FIG. 5. In use, a forward-looking UAV camera can navigate through the access point by first imaging the medium-sized fiducial markers, and then the small fiducial markers, and determining its navigation solution based upon the known location of the imaged fiducial markers as retrieved from the fiducial map.

Figure 7:
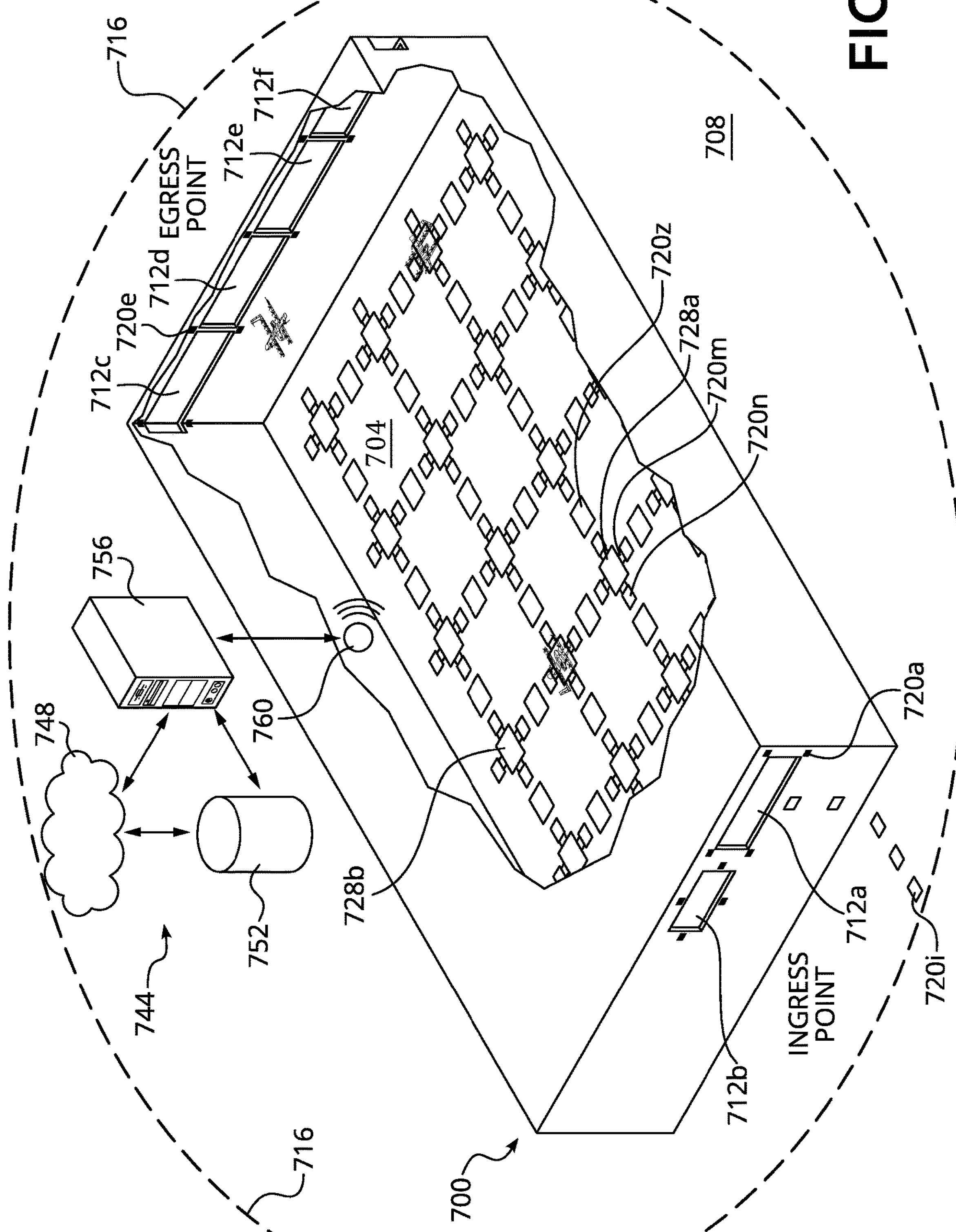
FIG. 7 is a perspective view of a UAV storage facility, in accordance with an embodiment of the disclosure.

FIG. 7 illustrates a UAV storage facility 700 for storing and servicing a plurality of UAVs. In the illustrated embodiment, the UAV storage facility 700 is a warehouse having an interior overflight area 704. In some embodiments, UAV storage facilities may have a well-lit overflight area 704, in order to not degrade performance by UAV navigation systems. In some embodiments, the overflight area 704 may be relatively flat (for example, optical flow based navigation systems perform better on flat surfaces). In some embodiments, the overflight area 704 may be relatively free from obstacles (e.g., obstacles having a width and/or height of greater than about 1 meter), in order to not degrade performance of UAV navigation systems. In some embodiments, the overflight area 704 may have a non-reflective floor, which may be textured (such as may be applied with paint or tape), to facilitate image acquisition by UAV fiducial navigation systems. In other embodiments, the UAV storage facility 700 may be another structure or shelter for storing a plurality of UAVs, for example a hangar, a series of revetments, a parking lot, a parking garage, etc. In other embodiments, the UAV storage facility may not be configured, per se, to store a plurality of UAVs, but may nevertheless serve as a place to store at least one UAV, such as an office building, a house, a school, a hospital, an open field, etc.

The UAV storage facility 700 of FIG. 7 is a substantially closed structure bounded by a roof and a series of walls forming a perimeter surrounding the indoor overflight area 704. The UAV storage facility 700 is surrounded by an outdoor area 708. The UAV storage facility 700 includes a plurality of access points 712*a*-712*f* through the perimeter that enable ingress and egress. The access points 712*a*-712*f* are windows in FIG. 7, however in other embodiments one or more access points may be a door or other opening having a size large enough to allow a UAV to pass through.

The UAV storage facility 700 may exist within a fiducial navigation "zone," "curtain," or "bubble" 716 inside which a UAV 100 is required to navigate utilizing the FNS 204 at least in-part. When operating within the fiducial navigation zone 716, a UAV 100 may rely partially, primarily, or entirely on the FNS 204. In some embodiments, the UAV 100 may rely on the NFNS 208 to reinforce navigation by the FNS 204. In some embodiments, the GPS, barometer, and/or other non-fiducial navigation instruments may be ignored entirely inside the fiducial navigation zone 716.

Accordingly, a plurality of fiducial markers (e.g., 720*a*, 720*e*, 720*i*) are positioned within the fiducial navigation zone 716 such that a UAV 100 can image at least one fiducial marker 720 (and preferably more than one, e.g., two fiducial markers) from anywhere within the fiducial navigation zone 716. In some embodiments, one or more fiducial markers (such as 720*a*) may be large enough such that a UAV 100 can image that fiducial marker 720 from outside the fiducial navigation zone 716, i.e., before it is required to navigate using the FNS 204. The fiducial navigation zone 716 may coincide with, or overlap at least partially with, known GPS-degraded or GPS-denied areas. In the confined and potentially crowded context of a UAV storage facility 700, the fiducial navigation zone 716 is advantageous because it 1) enables precision landings 2) reduces the likelihood of collisions with other UAVs and 3) reduces safety risks to humans. In some embodiments, the fiducial navigation zone 716 may envelope at least a portion of the interior of the UAV storage facility 700 and also some portion of the surrounding outdoor area 708, e.g., a radius surrounding the UAV storage facility 700 of about 10 meters (in all above-ground directions), about 50 meters, about 100 meters, etc. In some embodiments, the fiducial navigation zone 716 need not extend in all directions around the UAV storage facility 700, but may encompass areas of particular importance, such as a UAV approach path and/or a UAV departure path. The boundaries of the fiducial navigation zone 716 may be demarcated by certain coordinates (such as may be recognized by the FNS 204 or NFNS 208), by a signal transmitted to the UAV 100 (such as by infrared transmitter), or by other means.

Each access point 712 of the UAV storage facility 700 is associated with a plurality of fiducial markers positioned in close proximity thereto. For example, access point 712*a*—a window through an exterior wall—may serve as the primary ingress point for UAVs entering the storage facility 700. Access point 712*a* is associated with four fiducial markers (e.g., 720*a*) positioned adjacent to its corners on an exterior wall surface. Similarly, access point 712*d* may be the primary egress point for UAVs exiting the UAV storage facility 700, and is associated with four fiducial markers (e.g., 720*e*) positioned adjacent to its corners on an interior wall surface. For simplicity of communication, only four fiducial markers are illustrated in relation to each access point 712*a* and 712*e*. In some embodiments, a lesser number or a greater number of fiducial markers may be positioned around an access point, e.g., eight fiducial markers as shown in relation to the UAV charging pad 500 in FIG. 5. Generally, a greater number of fiducial markers positioned around an access point may facilitate fiducial navigation. Further, the size of each fiducial marker may correspond generally to the examples of FIGS. 5 and 6, but in some embodiments may have different absolute and relative sizes.

An array of UAV charging pads (e.g., 728*a* and 728*b*) is positioned inside the UAV storage facility 700 in order to receive and recharge a plurality of UAVs (e.g., 100*a* and 100*b*). Each charging pad 728 may inductively charge a UAV power source, for example via the charging interface 136 of the UAV 100 of FIGS. 1A and 1B. Accordingly, each UAV charging pad 728 may be electrically connected to a utility grid or other power source, e.g., a generator, a battery, a solar panel, a wind turbine, etc. In some embodiments, the electrical connections between the UAV charging pads 728 and the power source may be concealed in a flooring system or by other means (e.g., with a tape or other material having a similar coloration to the UAV charging pad). Concealing electrical connections and other ancillary aspects of the charging pad 728, and de-cluttering the charging pad 728 generally, may advantageously facilitate UAV fiducial navigation by reducing the number of erroneous visual "targets" that the FNS 204 could potentially image.

Each UAV charging pad 728 is similar to the embodiment of FIG. 5 in that it is surrounded by a first group of small fiducial markers (e.g., 720*m*) and a second group of larger fiducial markers (e.g., medium-sized fiducial markers) (e.g., 720*n*). Similar to the exemplary configuration of FIG. 6, each UAV charging pad 728 is spaced apart from each adjacent UAV charging pad 728 by a large fiducial marker (e.g., a large fiducial marker having a side length of about 64 cm) (e.g., 720*z*. In some embodiments, the UAV charging pads may have a different arrangement or pattern, such a hub-and-spoke arrangement, a randomized arrangement, or any other arrangement as may be necessary to suit space constraints of the UAV storage facility 700. In some embodiments, the fiducial markers (e.g., 720*m*, 720*n*, 720*e*) may be spaced with sufficient density such that a UAV 100 navigating inside the UAV storage facility 700 can image at least two fiducial markers from any position.

The UAV storage facility 700 may be communicatively connected with an optional controller system 744 (e.g., a "control tower") that includes a network 748, a data store 752, a controller 756 (e.g., servers in a distributed system, local computer, a combination thereof, or the like), and a communication system 760 (e.g., RF transceiver, WIFI® transceiver, BLUETOOTH®, or the like). To clarify, the controller system 744 differs from the controller 212 of the UAV.

In the embodiment of FIG. 7, the controller system 744 for the UAV storage facility 700 is configured to execute a number of important functions in relation to the UAV navigation system 200. For example, the controller system 744 is configured to receive, via the communication system 760, a status update from a UAV 100 navigating in or around the UAV storage facility 700. Based upon the status update, the controller system 744 may transmit a signal instructing the UAV 100 to transition to a fiducial navigation mode when it enters the fiducial navigation zone 716. In some embodiments, the controller system 744 may transmit a signal informing the UAV 100 which geographic area it is operating within (e.g., which zip code), and may also transmit to the UAV 100 an updated fiducial map 300 corresponding to that geographic area. Because identical fiducial markers may be reused in different geographical areas, a UAV's confirmation of the geographic area in which it operates may enable it to retrieve the correct fiducial map (e.g., 300*b* or 300*c*) from the controller system 744, or to retrieve the correct unique fiducial dataset (e.g., 304*a* or 304*b*) from the fiducial map 30. This may be particularly important in embodiments when fiducial markers are located on moving UAVs 100 and therefore change in real time, or at least frequently. In some embodiments, the controller system 744 may transmit a flight plan to a UAV 100, for example a de-conflicted flight plan based upon one or more fiducial markers.

Figure 8:
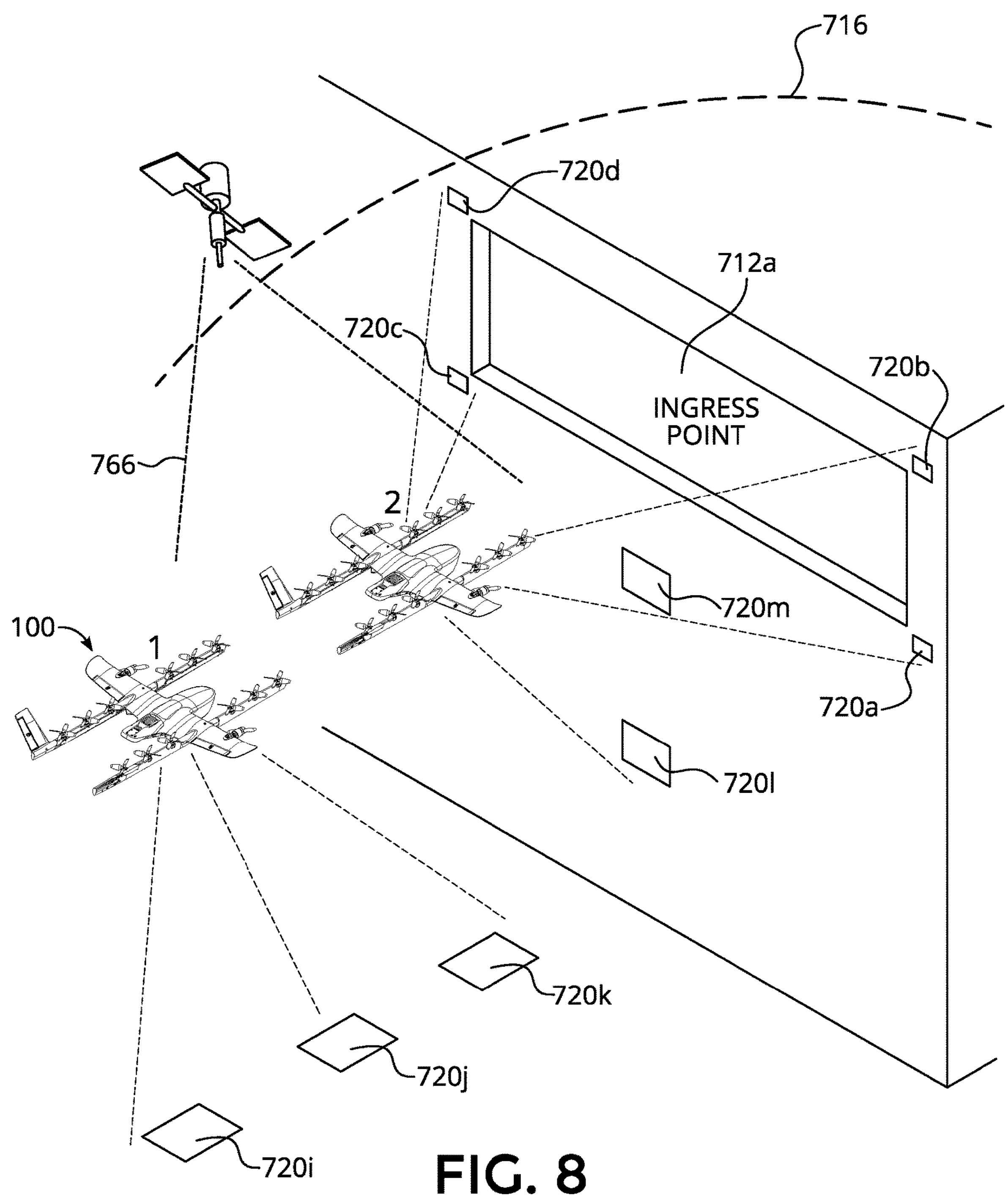
FIG. 8 is a perspective view of a UAV approaching the UAV storage facility of FIG. 7.

FIG. 8 illustrates a UAV 100 approaching the UAV storage facility 700 of FIG. 7. The UAV 100 enters the fiducial navigation zone 716 and recognizes this change in one or more ways, such as by imaging a particular fiducial marker (e.g., fiducial marker 720*i*) that is known to be within the fiducial navigation zone 716 (and is associated with such information in the fiducial map). Additionally or alternatively, the UAV 100 may receive a signal from the controller system 744 of FIG. 7 indicating that it is within the fiducial navigation zone 716. Regardless, when the UAV 100 recognizes its entry into the fiducial navigation zone 716, its navigation system 200 transitions from a non-fiducial navigation mode in which it navigates without aid of the FNS 204, to a fiducial navigation mode in which it navigates at least partially based upon the FNS 204. Thus, even though the UAV 100 may receive a reliable GPS signal 766 or may navigate reliably using another non-fiducial navigation method (for example, visual odometry), its navigation system 200 nevertheless relies at least partially on the FNS 204 while navigating within the fiducial navigation zone 716.

A group of "glide path" fiducial markers 720*i*-720*m* are positioned on the ground and aligned with the access point 712*a* into the UAV storage facility 700. The fiducial markers 720*i*-720*m* may be spaced close enough that the UAV's camera 140 may image at least two fiducial markers 720*i*-720*m* at any given time from a certain altitude. By associating each imaged fiducial marker 720*i*-720*m* with the corresponding unique fiducial dataset (e.g., 304*a*) stored in the fiducial map 300, and by retrieving the position information indicated by each unique fiducial dataset (e.g., 304*a*), the FNS 204 can determine its navigation solution and guide the UAV 100 toward the access point 724.

As the UAV 100 approaches the access point 712*a*, it comes within imaging range of the fiducial markers 720*a*-720*d*, each of which are positioned adjacent to a corner of the access point 712*a*. The camera 140 may pivot to a forward-looking orientation and/or the UAV 100 may include a separate, forward-looking camera, in order to image the fiducial markers 720*a*-720*d*. The UAV camera 140 images at least one of fiducial markers 720*a*-720*d*, if not two, three, or all four. By associating each imaged fiducial marker 720*a*-720*d* with the corresponding unique fiducial dataset 304 from the fiducial map 300, the FNS 204 can guide the UAV 100 safely toward and through the access point 712*a* by determining its navigation solution and the location of the access point 724 (in particular, the location of the access point boundaries, such as the edges or the corners).

Figure 9:
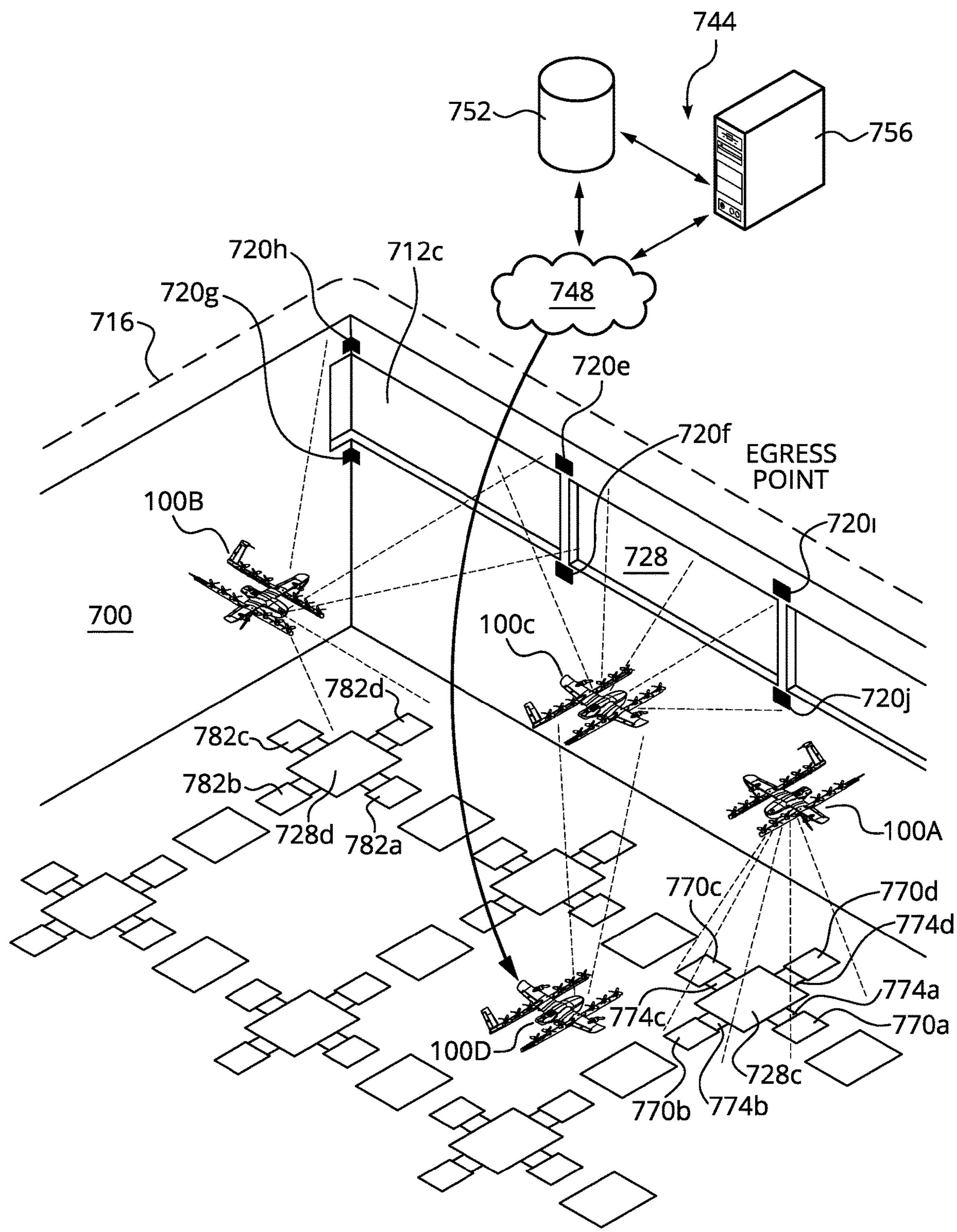
FIG. 9 is a perspective view of a plurality of UAVs operating inside the UAV storage facility of FIG. 7.

FIG. 9 illustrates a plurality of UAVs 100*a*-100*d* navigating within the UAV storage facility 700 of FIG. 7, which houses an array of UAV charging pads (e.g., 728*c* and 728*d*). As with FIG. 8, the UAVs 100 are operating within the fiducial navigation zone 716 and therefore rely at least partially on the FNS 204. Each UAV 100*a*-100*d* exemplifies a different operating scenario.

UAV 100*a* is illustrated executing a precision landing maneuver on charging pad 728*c*. As UAV 100*a* descends to a first altitude of about 6 meters, its camera 140 images the medium-sized fiducial markers 770*a*-770*d* positioned around the charging pad 728*c*. By associating each imaged fiducial marker 770*a*-770*d* with the corresponding unique fiducial dataset (e.g., 304*a*) from the fiducial map 300, the FNS 204 can accurately determine the UAV's navigation solution based upon the known locations at the four sides of the charging pad 728*c*, and can guide the UAV 100*a* downward toward its final coordinate on the charging pad 728*c*. As the UAV 100*a* descends to about 3 meters, the medium-sized fiducial markers 770*a*-770*d* fall outside the field of view of the UAV camera 140; however, the small fiducial markers 774*a*-774*d* remain within the field of view, and the camera 140 images each of these small fiducial markers 774*a*-774*d*. With this new information, the FNS 204 refreshes its navigation solution. Having determined its navigation solution with a high degree of accuracy, the FNS 204 causes the UAV 100*a* to land on the charging pad 728*c*.

UAV 100*b* is illustrated after taking off from UAV charging pad 728*d* and executing a flight plan that includes initializing its navigation system 200 and egressing the UAV storage facility 700 through access point 712*c*. The charging pad 728*d* is associated with a first group of fiducial markers 782*a*-782*d*, and the access point 712*c* is associated with a second group of fiducial markers 720*e*-720*h*. The charging pad 728*d* is positioned near enough to the access point 712*c* that the UAV camera 140 can image at least two fiducial markers of either/both of the first and second group of fiducial markers 782*a*-782*d* and 720*e*-720*h* at all times. This proximity helps the UAV camera 140 transition from imaging the first group of fiducial markers 782*a*-782*d* positioned near the (horizontal) charging pad to imaging the second group of fiducial markers 720*e*-720*h* positioned near the (vertical) access point 712*c*. Upon takeoff, UAV 100 images the first group of fiducial markers 782*a*-782*d* to determine its navigation solution. The UAV 100 continues to navigate within the fiducial navigation zone 716 using the FNS 204, periodically updating its navigation solution based on fiducial markers inside the UAV storage facility, e.g., the second group of fiducial markers 720*e*-720*h*. Before the UAV 100 exits the fiducial navigation zone 716 (e.g., after it exits through access point 712*c*), it compares its navigation solution determined by the FNS 204 with a second navigation solution determined utilizing the NFNS 208 (e.g., the GPS system) in order to validate the second navigation solution if the second navigation solution has a required position accuracy (e.g., an accuracy of about 5 m). If the first and second navigation solutions agree (e.g., are within about five meters of each other), then second navigation solution has the required position accuracy and the UAV 100 can proceed to exit the fiducial navigation zone 716 and navigate beyond the fiducial navigation zone 716. If the first and second navigation solutions do not agree (e.g., with about 5 meters), then the UAV 100 is not allowed to exit the fiducial navigation zone 716 and, in some embodiments, may execute a contingency routine as described below (e.g., land in place).

UAV 100*c* is illustrated approaching the access point 712*d*, which is surrounded at the corners by four adjacent fiducial markers 720*e*, 720*f*, 720*i*, and 720*j*. The UAV camera 140 is oriented in a forward-facing direction and images each fiducial marker 720*e*, 720*f*, 720*i*, and 720*j*. Because the FNS 204 is able to precisely determine its navigation solution from these images, and because it knows the corner locations of the access point 712*d*, the FNS 204 causes UAV 100*c* to safely navigate through the access point 712*d*.

UAV 100*d* illustrates an embodiment in which fiducial markers may be positioned not only at fixed locations, but also on moving UAVs such that the real-time position of UAVs can be tracked. Such an embodiment advantageously reduces the likelihood of mid-air collisions between UAVs. In this embodiment, a fiducial marker is fixed upon UAV 100*c*, which may continually or periodically transmit its real-time navigation solution (as determined by the FNS 204, for example) to the remote controller system 744. The controller system 744 may, in turn, periodically transmit UAV 100*c*'s dynamic fiducial dataset to other UAVs operating in the area, either as a pushed signal or in response to a request from one or more UAVs. Each UAV 100 that receives the current location of UAV 100*c* then updates its fiducial map 300 by updating the unique dynamic fiducial dataset corresponding to the fiducial marker affixed to UAV 100*c*.

In the illustrated embodiment, UAV 100*d* has received the current location of UAV 100*c* from the controller system 744 and updated its fiducial map 300 accordingly. UAV 100*d* uses its camera 140 to image UAV 100*c* and the fiducial marker affixed thereto. By associating the image of UAV 100*c*'s fiducial marker with the corresponding unique fiducial dataset in the fiducial map 300, UAV 100*d* can determine its navigation solution. With this knowledge, the FNS 204 of UAV 100*d* can navigate it away from UAV 100*c* to avoid a mid-air collision. Additionally or alternatively, the remote controller system 744 can determine the likelihood of a mid-air collision between UAV 100*c* and UAV 100*c*, and can transmit a de-conflicted flight plan to UAV 100*c* and/or UAV 100*d*.

Having introduced exemplary aspects and operating environments of the FNS 204, logic modules that are stored on-board the controller as software logic (e.g., executable software code), firmware logic, hardware logic, or various combinations thereof will now be described. Referring back to FIG. 2, the data store 228 of the controller 212 stores the fiducial map 300 and the plurality of logic modules, including the fiducial navigation transition module 236, the fiducial navigation module 240, the fiducial approach module 244, the fiducial traverse module 248, the fiducial landing module 252, the fiducial initialization module 256, the air-to-air fiducial navigation module 260, the fiducial contingency module 264, the fiducial disturbance module 268, and the fiducial test module 272. As used in the descriptions below, a module may "cause" the UAV 100 to execute one or more actions by instructing the power source 128, horizontal and/or vertical propulsion units 116 and 120, control surfaces 124, and/or other UAV systems in such a way that changes the UAV's altitude, velocity, yaw, pitch, roll, heading, and/or other characteristic.

The logic, algorithms, interactions, relationships, properties, and other factors utilized by the modules of FIG. 2 are stored on the data store 228. In the illustrated embodiment, all the modules identified in FIG. 2 are stored on-board the UAV on the controller 212. In some embodiments, any module may be stored in part or in whole on external storage resources. Likewise, the modules of FIG. 2 are associated with the processor 224 of controller 212. In some embodiments, any module may be executed in part or in whole on one or more processors that are external to the UAV 100 (such as the controller system 744 of FIG. 7); in such embodiments, information may be exchanged between the UAV 100 and the external processor by one or more wireless communication systems. Any module of FIG. 2 may be initiated automatically in response to one or more triggers. In some embodiments, any module may be initiated manually.

The fiducial navigation transition module 236 causes the UAV 100 to transition from the non-fiducial navigation mode in which the UAV 100 navigates without aid of the FNS 204, to the fiducial navigation mode in which the UAV 100 navigates at least partially based upon the FNS 204. A variety of triggers may initiate the fiducial navigation transition module 236, for example: when NFNS 208 performance falls below a certain threshold (e.g., when a GPS signal weakens in a GPS-denied or GPS-degraded environment); entry of the UAV 100 into a fiducial navigation zone; when the UAV 100 experiences a contingency (e.g., unexpected movement on the charging pad); when a flight plan or built in test instructs the UAV 100 to enter fiducial navigation mode; when the UAV camera 140 images a particular fiducial marker; when the UAV 100 descends below a threshold altitude (e.g., 50 meters); manual activation by a human operator; etc. Once triggered, the fiducial navigation transition module 236 activates the FNS 204 if it is not already activated. In some embodiments, the fiducial navigation transition module 236 may express a binary preference for navigation utilizing the FNS 204 over the NFNS 208, e.g., ignoring the NFNS 208 entirely while the FNS 204 is activated, or ignoring GPS and/or other navigational instrument. In embodiments in which GPS is ignored entirely while the UAV 100 utilizes the FNS 204, the navigation system 200 may utilize one or more instruments of the NFNS 208 (e.g., an IMU and accelerometer) to aid fiducial navigation. In some embodiments, the fiducial navigation transition module 236 may assign a greater weight or priority level to navigational outputs from the FNS 204 as compared to the NFNS 208, for example, a weight of 0.6 (on a 1.0 scale) or a first priority level that is utilized by the navigation system 200 before any other navigational output. The fiducial navigation transition module 236 has additional functionality, in that it causes the navigation system 200 to adjust a reliance level on the FNS 204 based upon one or more factors, e.g., altitude, signal quality from other navigational systems (e.g., GPS), proximity to a UAV charging pad or a structural access point, an airspace traffic level, and/or other factors. In some embodiments, the reliance level on the FNS 204 may be a function of altitude. In particular, the fiducial navigation transition module 236 may cause the UAV 100 to increasingly rely on the FNS 204 as it gets closer to the ground. For example, at an altitude of about 50 meters, the UAV 100 may rely primarily on the GPS system. As the UAV 100 approaches a UAV storage facility and descends to 25 meters, the fiducial navigation transition module 236 may cause the UAV 100 to rely primarily on another aspect of the NFNS 208, such as visual odometry. As the UAV 100 nears the UAV storage facility and descends below 10 meters, the fiducial navigation transition module 236 may cause the UAV 100 to rely primarily on the FNS 204. When the UAV 100 enters the storage facility, the fiducial navigation transition module 236 may cause the UAV 100 to rely entirely on the FNS 204. The foregoing ranges are merely exemplary, and may vary between embodiments.

The fiducial navigation module 240 causes the UAV 100 to navigate using the FNS 204 at least in part. For example, the fiducial navigation module 240 causes the camera 140 to image one or more fiducial markers. The fiducial navigation module 240 further causes the controller 212 to compare codes associated with images in the fiducial map 300 to images captured by the UAV's camera 140, and to positively identify the imaged fiducial markers. If and when the imaged fiducial markers are positively identified, then the controller 212 retrieves from the fiducial map 300 the unique fiducial dataset including latitude, longitude, and potentially other information associated with that fiducial marker (e.g., altitude, zip code, and/or heading), thereby informing the UAV 100 of the imaged fiducial marker's geographical position (and potentially other information). The controller 212 may retrieve information from the fiducial map 300 in whole or in part, to facilitate execution of any logic module described herein. With the location of the identified fiducial marker known, the UAV 100 determines its navigation solution based upon the known location of the imaged fiducial marker (as retrieved from the fiducial map 300). In some embodiments, the UAV 100 determines its navigation solution also based on analysis of the image captured by the camera 140 (e.g., analyzing the size and position of the fiducial marker in the image). The fiducial navigation module 240 then executes one or more actions based upon the known location of the imaged fiducial marker and/or the determined location of the UAV 100. For example, the fiducial navigation module 240 can navigate the UAV 100 toward or away from the imaged fiducial marker. In some embodiments, the fiducial navigation module 240 may cause the fiducial map 300 to update to reflect the real-time fiducial marker information, e.g., by periodic software update transmitted to the UAV 100 by a remote controller system (such as controller system 744). The fiducial navigation module 240 may also complement non-fiducial navigation by the UAV 100. For example, the fiducial navigation module 240 may determine a navigation solution based upon one or more imaged fiducial markers, and then compare that fiducial navigation solution with another navigation solution determined by the NFNS 208 (e.g., a GPS navigation solution). If the navigation solution determined by the fiducial navigation module 240 agrees (e.g., within 1 meter, 5 meters, or other tolerance level), then the non-fiducial navigation solution is validated and the UAV 100 may continue navigating utilizing the NFNS 208.

The fiducial approach module 244 causes the UAV 100 to safely approach a particular waypoint, structure (such as a UAV storage facility), access point, charging pad, or other target of navigational relevance. The fiducial approach module 244 causes the UAV 100 camera to image, in sequence, a series of fiducial markers positioned on an approach path (or glide path) to a structure, such as described above with respect to FIG. 8. The locations of the fiducial markers are identified using the fiducial map 300 as described above, and the fiducial approach module 244 uses this information to determine its navigation solution. In some embodiments, the fiducial approach module 244 further causes the UAV 100 to navigate toward each successive fiducial marker in the approach path. In some embodiments, the fiducial approach module 244 may cause the UAV 100 to gradually reduce altitude and/or speed as it approaches the target.

The fiducial traverse module 248 causes the UAV to safely traverse an opening, such as a window, a door, or another type of access point in a vertical or near-vertical wall, as described in the context of FIGS. 8 and 9. As the UAV 100 approaches the access point, the fiducial traverse module 248 causes the camera 140 to image a group of fiducial markers positioned adjacent to the access point. The imaging occurs at a sufficiently large distance from the access point that the camera's field of view captures at least one of the fiducial markers positioned adjacent to the access point. The fiducial traverse module 248 then associates the image of each fiducial marker surrounding the access point with the corresponding unique fiducial dataset stored in the fiducial map 300. Then, the controller 212 retrieves the corresponding unique fiducial dataset for each reference fiducial marker from the fiducial map 300. This information provides a group of geographical reference points (such as may correspond to the edges and/or corners of the access point) and enables the FNS 204 to determine its navigation solution, and in some embodiments that the access point is located between the four reference points. With this determination, the FNS 204 directs the UAV 100 to navigate through the access point. In some embodiments, a first group and a second group of fiducial markers may be positioned in close proximity to the access point, with the first group being spaced further away from the access point than the second group of markers, and with the fiducial markers of the first group having a larger size than the fiducial markers of the second group. A similar arrangement is illustrated in the context of a charging pad in FIGS. 5 and 6; the characteristics of those examples may generally be applied to an access point, and are not limited to a charging pad or horizontal surface. In such embodiments, the fiducial traverse module 248 may cause the camera to initially image the first group of relatively larger fiducial markers, and then to image the relative smaller fiducial markers of the second group as the UAV approaches the access point.

The fiducial landing module 252 causes the UAV 100 to safely land on a UAV charging pad, landing pad, or other type of target located on a relatively horizontal surface, such as shown in FIGS. 5-6 and 9 above. As the UAV 100 approaches the UAV charging pad, the fiducial landing module 252 causes the camera 140 to image a group of fiducial markers positioned adjacent to the charging pad. The imaging occurs at a sufficiently large distance from the charging pad that the camera's field of view captures all of the fiducial markers positioned adjacent to the charging pad. The fiducial landing module 252 then associates the image of each fiducial marker that surrounds the charging pad with the corresponding unique fiducial dataset in the fiducial map 300, and retrieves the unique fiducial datasets. This information provides a group of geographical reference points (such as may correspond to the edges and/or corners of the UAV charging pad) and enables the FNS 204 to determine the UAV's navigation solution. With this determination, the FNS 204 directs the UAV 100 to descend toward the UAV charging pad. In some embodiments, the fiducial landing module 252 may cause the UAV 100 to reduce its velocity as it approaches the UAV charging pad. In some embodiments as shown in FIGS. 5 and 6, a first group and a second group of fiducial markers may be positioned in close proximity to the UAV charging pad, with the first group being spaced further away from the UAV charging pad than the second group of markers, and with the fiducial markers of the first group having a larger size than the fiducial markers of the second group. In such embodiments, the fiducial landing module 252 may cause the camera 140 to initially image the first group of relatively larger fiducial markers, and then to image the relative smaller fiducial markers of the second group as the UAV 100 approaches and lands on the UAV charging pad.

The fiducial initialization module 256 utilizes the FNS 204 to verify the NFNS 208 before the UAV 100 exits a GPS-degraded area or a GPS-denied area. For example, upon takeoff from a charging pad in a fiducial navigation zone, the fiducial initialization module 256 causes the UAV camera 140 to image one or more fiducial markers, and then to determine a navigation solution utilizing the FNS 204 that includes latitude and longitude (and in some embodiments, a heading). The UAV 100 continues to navigate within the fiducial navigation zone using the FNS 204, periodically updating its navigation solution based on the fiducial markers. Before the UAV 100 exits the fiducial navigation zone, it computes a first navigation solution utilizing the FNS 204 and a second navigation solution utilizing the NFNS 208 (e.g., the GPS system). The second navigation solution is then validated against the first navigation solution to determine if the NFNS 208 has a required position accuracy (e.g., about a 5 meter accuracy). If the first and second navigation solutions agree (e.g., are within about five meters of each other), then the UAV 100 can proceed to exit the fiducial navigation zone and navigate based upon the NFNS 208. On the other hand, if the first and second navigation solutions do not agree (e.g., are not within about five meters of each other), then the UAV 100 continues to navigate based upon the FNS 204. In some embodiments, the takeoff initialization module 256 may not permit the UAV 100 to exit the fiducial navigation zone until the two navigation solutions agree. In some embodiments, the takeoff initialization module 256 may cause the UAV 100 to execute one or more contingency modules if the two navigation solutions do not agree.

The air-to-air fiducial navigation module 260 may operate in embodiments in which fiducial markers are attached to one or more (mobile) UAVs. In such embodiments, the air-to-air fiducial navigation module 260 of a first UAV may periodically request from a remote controller system to receive the current location of a second UAV (such as another UAV operating in the same area). In response to such a request, the remote controller system may transmit to the first UAV a partial or complete updated UAV fiducial map 300. When the first UAV receives the updated UAV fiducial map 300, the module then updates its previous fiducial map 300 in part or in whole. The air-to-air fiducial navigation module 260 also causes the primary UAV camera 140 to image a fiducial marker affixed to a second UAV, and then to associate the imaged fiducial marker with the corresponding unique fiducial dataset in the (updated) fiducial map 300. This enables the first UAV to determine its navigation solution and the location of second UAV. The air-to-air fiducial navigation module 260 may then cause the first UAV to navigate away from the second UAV in order to avoid a mid-air collision. Additionally or alternatively, the air-to-air fiducial navigation module 260 can determine a likelihood of a mid-air collision between the first and second UAVs. If the likelihood of a collision exceeds a threshold level, then the air-to-air fiducial navigation module 260 may request a de-conflicted flight plan from a remote source (e.g., a remote controller system).

The fiducial contingency module 264 prevents unsafe navigation in the event a UAV 100 attempts to exit a fiducial navigation zone, otherwise cease fiducial navigation, or navigate using the NFNS 208 without first validating the NFNS 208. This scenario could occur, for example, when the UAV 100 attempts to egress the UAV storage facility or fiducial navigation zone, but cannot validate a GPS signal beforehand. The fiducial contingency module 264 determines when two conditions are met: when the NFNS 208 (e.g., a GPS signal) cannot be validated and when the UAV 100 is otherwise prepared to reduce its reliance on the FNS 204 (e.g., due to its flight plan causing it to leave the UAV storage facility). When both conditions are met, the fiducial contingency module 264 prevents the UAV 100 from reducing its reliance on the FNS 204—which may prevent the UAV 100 from leaving the UAV storage facility or UAV navigation zone—and may cause the UAV to land (e.g., landing immediately, and/or landing by descending straight down). In another embodiment, the fiducial contingency module 264 executes when a reliability level of the NFNS 208 falls below a first threshold (e.g., below a 50% confidence level) and also when a reliability level of the FNS 204 falls below a second threshold (e.g., below a 50% confidence level). This may occur, for example, when inclement weather comprises a GPS signal and also the ability to rely on other non-fiducial navigation methods (e.g., visual odometry), when a technical problem (such as a sensor fault) causes at least part of the navigation system to fail, when the UAV 100 is navigating in unfamiliar terrain devoid of fiducial markers or other reference points, when the UAV's power source 128 is exhausted, or other scenario. In the event of such a contingency, the fiducial contingency module 264 causes the UAV 100 to hover in place for a time period (e.g., one minute, five minutes, etc.), to scan the area below it for obstacles, and if the reliability levels of the NFNS 208 or FNS 204 have not risen over the first and second thresholds during the hover period, to land the UAV 100 (e.g. land immediately). In some embodiments, the fiducial contingency module 264 may instruct the UAV camera 140 to image any fiducial marker that is within its field of view, and to land the UAV 100 on that fiducial marker.

The fiducial disturbance module 268 ensures that the UAV 100 recalibrates its stored position in the event that it is moved more than a threshold amount while landed. The fiducial disturbance module 268 causes the UAV 100 to determine its navigation solution using the FNS 204 immediately prior to landing, or while landed. Then, the fiducial disturbance module 268 causes the UAV 100 to monitor its position while landed (using any of the available navigation systems, e.g., GPS and/or IMU). If the fiducial disturbance module 268 detects that the position of the UAV 100 changes more than a permissible threshold level (e.g., 0.1 meter, 0.5 meter, 1.0 meter, etc.), then it invalidates the navigation solution determined immediately prior to landing. Subsequently, the fiducial disturbance module 268 causes the UAV 100 to re-acquire its position using one or more available navigation systems. For example, the UAV 100 may re-acquire its position by imaging a fiducial marker with the camera 140.

The fiducial test module 272 helps the UAV 100 to calibrate its systems prior to embarking on a flight plan. For example, the fiducial test module 272 may be executed after the UAV 100 has landed on the charging pad, and prior to a next scheduled mission (for example, after the UAV 100 has been on the UAV charging pad for at least about thirty minutes). The fiducial test module 272 causes the UAV 100 to execute a flight plan that includes taking off (e.g., from the UAV charging pad) and testing the FNS 204 by imaging one or more fiducial markers (e.g., fiducial markers positioned near the UAV charging pad) and determining the locations of those fiducial markers from the fiducial map, and landing the UAV (e.g., back on the charging pad). In some embodiments, the fiducial test module 272 may cause the UAV 100 to do one or more of the following: hover in place (e.g., at an altitude of approximately two meters or other altitude), test a propulsion device, test a control surface, and execute a test flight plan.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV) navigation system, comprising:

a UAV charging pad positioned at a storage facility;

a plurality of fiducial markers positioned at the storage facility, each fiducial marker of the plurality being associated with a respective fiducial dataset storing a position of a corresponding one of the fiducial markers, the fiducial datasets being stored in a fiducial map; and a UAV having a power source, a propulsion unit operably coupled with the power source, and a navigation system coupled to the propulsion unit, the navigation system including a camera, a fiducial navigation sub-system, a non-fiducial navigation sub-system, and logic that when executed causes the UAV to perform operations including:

imaging a first fiducial marker of the plurality with the camera;

transitioning from a non-fiducial navigation mode in which the UAV navigates without aid of the fiducial navigation sub-system, to a fiducial navigation mode in which the UAV navigates at least partially based upon the fiducial navigation sub-system;

accessing, from the fiducial map, a first fiducial dataset storing the position of the first fiducial marker; and navigating, based at least upon the first fiducial dataset storing the position of the first fiducial marker, into alignment with and landing on the UAV charging pad, wherein the plurality of fiducial markers includes the first fiducial marker positioned adjacent to a first side of the UAV charging pad and a second fiducial marker positioned adjacent to the first fiducial marker and radially outward from the UAV charging pad, wherein the first fiducial marker is smaller than the second fiducial marker to enable imaging of the first fiducial marker from an altitude at which the second fiducial marker is outside a field of view of the camera, and wherein the UAV charging pad is a first UAV charging pad, the UAV navigation system further including a second UAV charging pad separated from the first UAV charging pad by a third fiducial marker that is larger than the first and second fiducial markers, to enable the UAV to determine a navigation solution based on the third fiducial marker at an altitude higher than the camera can identify the first or second fiducial markers.

2. The UAV navigation system of claim 1, wherein the plurality of fiducial markers includes a fourth fiducial marker positioned adjacent to a second side of the UAV charging pad, to enable imaging of at least one of the first or fourth fiducial markers by the camera immediately prior to landing.

3. The UAV navigation system of claim 2, further comprising a fifth fiducial marker positioned adjacent to the fourth fiducial marker and radially outward from the UAV charging pad, wherein the first and fourth fiducial markers are smaller than the second and fifth fiducial markers to enable imaging of at least one of the first or fourth fiducial markers from an altitude at which the second and fifth fiducial markers are outside a field of view of the camera.

4. The UAV navigation system of claim 2, further comprising a sixth fiducial marker positioned adjacent to a third side of the UAV charging pad and a seventh fiducial marker positioned adjacent to a fourth side of the UAV charging pad, to enable imaging of at least one of the first, fourth, sixth, or seventh fiducial markers by the camera immediately prior to landing.

5. The UAV navigation system of claim 2, wherein the first fiducial marker is adjacently surrounded by a contrasting region having an overall border gray value that is no darker than a fiducial gray value of the first fiducial marker.

6. The UAV navigation system of claim 1, wherein the UAV is a first UAV, the UAV navigation system further comprising a second UAV having a UAV fiducial marker associated with a dynamic fiducial dataset storing a real-time position of the UAV fiducial marker in the fiducial map, wherein the first UAV includes further logic that when executed causes the first UAV to perform further operations including:

imaging the UAV fiducial marker of the second UAV with the camera;

accessing, from the fiducial map, the dynamic fiducial dataset storing the real-time position of the UAV fiducial marker; and navigating around the second UAV based upon the real-time position of the UAV fiducial marker.

7. The UAV navigation system of claim 1, the UAV including further logic that when executed causes the UAV to perform additional operations comprising:

storing a UAV position of the UAV acquired immediately prior to landing on the UAV charging pad or while landed on the UAV charging pad;

monitoring the UAV position while landed to detect a threshold motion level after the UAV lands; and invalidating the UAV position if the threshold motion level is detected.

8. The UAV navigation system of claim 1, the UAV including further logic that when executed causes the UAV to perform additional operations comprising:

determining, while the UAV navigates within a fiducial navigation zone, a first navigation solution utilizing the fiducial navigation system, and a second navigation solution utilizing the non-fiducial navigation system;

validating the second navigation solution against the first navigation solution to determine if the non-fiducial navigation system has a required position accuracy; and navigating outside the fiducial navigation zone utilizing the non-fiducial navigation system if the non-fiducial navigation system has the required position accuracy.

9. The UAV navigation system of claim 1, the UAV including further logic that when executed causes the UAV to perform additional operations comprising:

executing a test flight plan that includes taking off from the UAV charging pad, determining a navigation solution based upon the fiducial navigation sub-system while the UAV hovers over the UAV charging pad, and landing on the UAV charging pad.

10. The UAV navigation system of claim 3, wherein the first, second, fourth, and fifth fiducial markers are each associated with a common heading, to assist the UAV to navigate into alignment with and land on the UAV charging pad.

11. The UAV navigation system of claim 1, wherein the fiducial map is a first fiducial map corresponding to a first geographic area, the UAV including further logic that, when executed causes the UAV to replace the first fiducial map with a second fiducial map corresponding to a second geographic area, when the UAV operates in the second geographic area, wherein the first fiducial map and the second fiducial map each store an identical fiducial marker code.

12. The UAV navigation system of claim 1, wherein the storage facility exists within a fiducial navigation zone inside which the UAV does not utilize a global positioning system to navigate, wherein transitioning to the fiducial navigation mode occurs inside the fiducial navigation zone, and the fiducial navigation mode does not utilize the global positioning system for navigation.

13. An unmanned aerial vehicle (UAV) navigation method, comprising:

providing a plurality of fiducial markers and a UAV charging pad at a storage facility, wherein each of the fiducial markers is associated with a respective fiducial dataset storing a position of a corresponding one of the fiducial markers, wherein the plurality of fiducial markers includes a first group of fiducial markers positioned around the UAV charging pad and a second group of fiducial markers positioned around an access point into the storage facility;

imaging one or more of the plurality of fiducial markers using a fiducial navigation sub-system of a UAV, the UAV having a navigation system including the fiducial navigation sub-system and a non-fiducial navigation sub-system;

transitioning the UAV from a non-fiducial navigation mode in which the UAV does not navigate based upon the fiducial navigation sub-system, to a fiducial navigation mode in which the UAV navigates at least partially based upon the fiducial navigation sub-system;

navigating the UAV through the access point based upon the second group of fiducial markers;

accessing, from a fiducial map stored onboard the UAV, a first fiducial dataset storing the position of a first fiducial marker of the first group; and navigating the UAV, based upon the first fiducial dataset storing the position of the first fiducial marker, into alignment with and landing on the UAV charging pad.

14. The UAV navigation method of claim 13, wherein the plurality of fiducial markers includes a third group of fiducial markers positioned outside the storage facility and proximal to the access point, the method further comprising:

navigating to the access point based upon the third group of fiducial markers.

15. The UAV navigation method of claim 13, wherein the fiducial map is a first fiducial map associated with a first geographical area, the UAV navigation method further comprising:

determining, based on a geographical position of the UAV retrieved using the non-fiducial navigation sub-system, whether the UAV is located in a second geographical area, and replacing the first fiducial map with a second fiducial map if the UAV is located in the second geographical area.

16. The UAV navigation method of claim 15, wherein the first and second fiducial maps each store an identical fiducial marker code.

17. At least one machine-accessible storage medium that provides instructions that, when executed by an unmanned aerial vehicle (UAV), will cause the UAV to perform operations comprising:

imaging one or more of a plurality of fiducial markers at a storage facility for the UAV using a fiducial navigation sub-system of the UAV, the UAV having a navigation system including the fiducial navigation sub-system and a non-fiducial navigation sub-system, wherein each of the fiducial markers is associated with a respective fiducial dataset storing a position of a corresponding one of the fiducial markers;

determining, based on a geographical position of the UAV retrieved using the non-fiducial navigation sub-system, a geographical area in which the UAV is currently located;

selecting a fiducial map from a plurality of fiducial maps based upon the determined geographical area, wherein the selected fiducial map stores the fiducial datasets of the fiducial markers at the storage facility;

accessing, from the selected fiducial map, a first fiducial dataset storing the position of a first fiducial marker of the plurality of fiducial markers; and navigating the UAV, based upon the first fiducial dataset, into alignment with and landing on a UAV charging pad.

18. At least one machine-accessible storage medium that provides instructions that, when executed by an unmanned aerial vehicle (UAV), will cause the UAV to perform operations comprising:

imaging one or more of a plurality of fiducial markers using a fiducial navigation sub-system of the UAV, the UAV having a navigation system including the fiducial navigation sub-system and a non-fiducial navigation sub-system, wherein each of the fiducial markers is associated with a respective fiducial dataset storing a position of a corresponding one of the fiducial markers;

navigating the UAV, based at least in part upon a first fiducial dataset associated with a first fiducial marker positioned adjacent to a UAV charging pad, into alignment with and landing on the UAV charging pad;

storing a UAV position of the UAV acquired immediately prior to landing on the UAV charging pad or while landed on the UAV charging pad;

monitoring the UAV while the UAV is landed on the UAV charging pad for a threshold motion level after the UAV lands; and invalidating the UAV position if at least the threshold motion level is detected.

19. At least one machine-accessible storage medium that provides instructions that, when executed by an unmanned aerial vehicle (UAV), will cause the UAV to perform operations comprising:

imaging one or more of a plurality of fiducial markers using a fiducial navigation sub-system of the UAV, the UAV having a navigation system including the fiducial navigation sub-system and a non-fiducial navigation sub-system, wherein each of the fiducial markers is associated with a respective fiducial dataset storing a position of a corresponding one of the fiducial markers, wherein the fiducial markers are positioned within a fiducial navigation zone for navigating the UAV via the fiducial markers;

determining, while the UAV navigates within the fiducial navigation zone, a first navigation solution utilizing the fiducial navigation system, and a second navigation solution utilizing the non-fiducial navigation system;

validating the second navigation solution against the first navigation solution to determine if the non-fiducial navigation system has a required position accuracy; and navigating outside the fiducial navigation zone utilizing the non-fiducial navigation system if the non-fiducial navigation system has the required position accuracy, wherein the fiducial markers are positioned about a storage facility including a UAV charging pad for charging the UAV and the storage facility is located within the fiducial navigation zone.

20. An unmanned aerial vehicle (UAV) system, comprising:

a UAV charging pad positioned at a storage facility;

a plurality of fiducial markers positioned at the storage facility, each of the fiducial markers being associated with a respective fiducial dataset storing a position of a corresponding one of the fiducial markers, the fiducial datasets being stored in a fiducial map; and a UAV having a power source, a propulsion unit operably coupled with the power source, and a navigation system coupled to the propulsion unit, the navigation system including a camera, a fiducial navigation sub-system, a non-fiducial navigation sub-system, and logic that when executed causes the UAV to perform operations including:

acquiring, with the camera, an image of a first fiducial marker of the plurality of fiducial markers;

transitioning from a non-fiducial navigation mode in which the UAV navigates without aid of the fiducial navigation sub-system, to a fiducial navigation mode in which the UAV navigates at least partially based upon the fiducial navigation sub-system;

analyzing the image to identify the first fiducial marker and to locate the UAV relative to the first fiducial marker;

accessing the fiducial map using the image to identify a first fiducial dataset storing the position of the first fiducial marker;

determining a navigation solution for the UAV based upon the image and the position of the first fiducial marker obtained from the fiducial map; and navigating, based upon the navigation solution, into alignment with and landing on the UAV charging pad.

* * * * *